United States Patent
Brandt et al.

(10) Patent No.: US 11,665,312 B1
(45) Date of Patent: May 30, 2023

(54) VIDEO REFORMATTING RECOMMENDATION

(71) Applicant: Snap Inc., Santa Monica, CA (US)

(72) Inventors: Joel Brandt, Venice, CA (US); Giles Goodwin, San Francisco, CA (US); Jared Iwata, Culver City, CA (US); Ian Wehrman, Santa Monica, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/234,000

(22) Filed: Dec. 27, 2018

(51) Int. Cl.
| | |
|---|---|
| H04N 7/01 | (2006.01) |
| G06F 3/0482 | (2013.01) |
| G11B 27/34 | (2006.01) |
| G06F 3/04845 | (2022.01) |
| G11B 27/031 | (2006.01) |
| G06F 3/04817 | (2022.01) |

(52) U.S. Cl.
CPC ......... *H04N 7/0122* (2013.01); *G06F 3/0482* (2013.01); *G06F 3/04817* (2013.01); *G06F 3/04845* (2013.01); *G11B 27/031* (2013.01); *G11B 27/34* (2013.01)

(58) Field of Classification Search
CPC . H04N 7/0122; G06F 3/04817; G06F 3/0482; G06F 3/04845; G11B 27/031; G11B 27/34
See application file for complete search history.

(56) References Cited

U.S. PATENT DOCUMENTS

| | | | | |
|---|---|---|---|---|
| 5,963,203 A | * | 10/1999 | Goldberg | G11B 27/034 715/723 |
| 6,161,115 A | * | 12/2000 | Ohanian | G11B 27/034 715/203 |
| 7,085,995 B2 | * | 8/2006 | Fukuda | G11B 27/034 348/E5.051 |

(Continued)

FOREIGN PATENT DOCUMENTS

JP    2009124298 A    6/2009

OTHER PUBLICATIONS

"U.S. Appl. No. 16/234,035, Non Final Office Action dated Nov. 29, 2019", 19 pgs.

(Continued)

*Primary Examiner* — Jeremy L Stanley
(74) *Attorney, Agent, or Firm* — Schwegman Lundberg & Woessner, P.A.

(57) ABSTRACT

Aspects of the present disclosure involve a system comprising a computer-readable storage medium storing at least one program and a method for detecting a plurality of shots in a video, each shot comprising a sequence of frames; automatically generating a modification to a visual presentation of one or more objects in a first shot of the plurality of shots; and generating, for display, a plurality of representations each associated with a respective one of the plurality of shots. The program and method further include receiving a user selection of a given representation of the plurality of representations corresponding to the first shot; and in (Continued)

response to receiving the user selection of the given representation, generating, for display, an indication of the automatically generated modification to the visual presentation of the one or more objects in the first shot.

20 Claims, 10 Drawing Sheets

(56) References Cited

U.S. PATENT DOCUMENTS

| | | | |
|---|---|---|---|
| 8,456,571 B1* | 6/2013 | Taylor | H04N 7/0122 348/445 |
| 8,594,488 B1* | 11/2013 | Grundmann | H04N 21/234345 386/278 |
| 8,731,285 B1* | 5/2014 | Hundemer | H04N 21/435 382/165 |
| 8,860,756 B2* | 10/2014 | Boreham | G06T 11/60 345/620 |
| 8,937,620 B1* | 1/2015 | Teller | G06T 13/80 345/473 |
| 9,177,603 B2* | 11/2015 | Bailey | G11B 27/105 |
| 9,196,306 B2* | 11/2015 | Flint | G11B 27/034 |
| 9,245,347 B2* | 1/2016 | Lin | G06F 3/04845 |
| 9,741,394 B2* | 8/2017 | Goz | H04N 5/76 |
| 9,930,270 B2* | 3/2018 | Soni | G06K 9/00718 |
| 9,933,935 B2* | 4/2018 | Flint | G11B 27/34 |
| 10,101,891 B1* | 10/2018 | Kulewski | G06F 3/04845 |
| 10,169,678 B1* | 1/2019 | Sachdeva | G05D 1/0221 |
| 10,257,436 B1* | 4/2019 | Zhang | G06K 9/00765 |
| 10,347,298 B2* | 7/2019 | Curcio | G11B 27/22 |
| 10,424,050 B2* | 9/2019 | Shimizu | G06T 3/4076 |
| 10,462,519 B2* | 10/2019 | Drake | H04N 21/44029 |
| 10,643,093 B1 | 5/2020 | Bhattacharjee et al. | |
| 10,671,852 B1* | 6/2020 | Zadeh | G06F 3/00 |
| 10,923,155 B2* | 2/2021 | Roberts | H04N 7/17336 |
| 2002/0154140 A1* | 10/2002 | Tazaki | G11B 27/034 345/620 |
| 2003/0016254 A1* | 1/2003 | Abe | G11B 27/034 715/864 |
| 2003/0227493 A1 | 12/2003 | Yokomizo | |
| 2004/0128308 A1* | 7/2004 | Obrador | G06F 16/4393 |
| 2004/0151471 A1* | 8/2004 | Ogikubo | G11B 27/031 386/230 |
| 2006/0156247 A1* | 7/2006 | McCormack | G06F 3/0481 715/767 |
| 2006/0188173 A1* | 8/2006 | Zhang | H04N 7/0122 382/276 |
| 2006/0235880 A1* | 10/2006 | Qian | G06F 16/48 |
| 2007/0074115 A1* | 3/2007 | Patten | G11B 27/032 |
| 2007/0162855 A1* | 7/2007 | Hawk | G11B 27/034 715/730 |
| 2007/0162873 A1* | 7/2007 | Haro | G11B 27/105 715/838 |
| 2007/0274686 A1* | 11/2007 | Broeksteeg | H04N 5/782 386/230 |
| 2008/0019661 A1* | 1/2008 | Obrador | H04N 5/144 386/210 |
| 2008/0159708 A1* | 7/2008 | Kazama | H04N 21/44008 386/333 |
| 2009/0153730 A1* | 6/2009 | Knee | G06T 3/0012 348/445 |
| 2009/0313545 A1* | 12/2009 | Kim | G06F 3/0488 715/720 |
| 2010/0003005 A1* | 1/2010 | Sugihara | G11B 27/28 386/248 |
| 2010/0013757 A1* | 1/2010 | Ogikubo | G06T 19/00 345/156 |
| 2010/0027960 A1* | 2/2010 | Shiitani | H04N 21/47217 386/241 |
| 2010/0238262 A1* | 9/2010 | Kurtz | H04N 7/142 348/14.01 |
| 2010/0281375 A1* | 11/2010 | Pendergast | G11B 27/34 715/723 |
| 2011/0026901 A1* | 2/2011 | Kashima | G06F 3/0482 386/282 |
| 2011/0064318 A1* | 3/2011 | Gao | G06F 16/70 382/224 |
| 2012/0198337 A1* | 8/2012 | Flint | G11B 27/34 715/723 |
| 2012/0210221 A1* | 8/2012 | Khan | G06F 3/048 715/716 |
| 2012/0210230 A1* | 8/2012 | Matsuda | G11B 27/34 715/723 |
| 2012/0210231 A1* | 8/2012 | Ubillos | G11B 27/34 715/723 |
| 2012/0281139 A1* | 11/2012 | Zhang | G06T 3/40 348/468 |
| 2012/0308209 A1* | 12/2012 | Zaletel | G11B 31/006 386/278 |
| 2012/0311107 A1* | 12/2012 | Van der Merwe | H04L 12/4641 709/220 |
| 2013/0050224 A1* | 2/2013 | Gehani | G06F 3/04847 345/473 |
| 2013/0050574 A1* | 2/2013 | Lu | G06K 9/00751 348/441 |
| 2013/0051767 A1 | 2/2013 | Soroushian et al. | |
| 2013/0051768 A1 | 2/2013 | Soroushian et al. | |
| 2013/0286240 A1* | 10/2013 | Kim | H04N 5/225 348/222.1 |
| 2013/0343727 A1* | 12/2013 | Rav-Acha | G11B 27/34 386/282 |
| 2013/0343729 A1* | 12/2013 | Rav-Acha | G11B 27/329 386/285 |
| 2014/0096002 A1* | 4/2014 | Dey | G06F 3/0488 715/723 |
| 2014/0181666 A1* | 6/2014 | Moore | G11B 27/034 715/716 |
| 2015/0063786 A1* | 3/2015 | Ma | G06F 3/0488 386/282 |
| 2015/0088977 A1* | 3/2015 | Monesson | G06F 3/0484 709/203 |
| 2015/0161565 A1 | 6/2015 | Kraft et al. | |
| 2015/0208023 A1 | 7/2015 | Boyle et al. | |
| 2015/0220249 A1* | 8/2015 | Snibbe | G06F 3/04842 715/719 |
| 2015/0268822 A1* | 9/2015 | Waggoner | G06F 3/167 715/722 |
| 2015/0332118 A1* | 11/2015 | Wang | G06K 9/00684 382/203 |
| 2016/0093078 A1* | 3/2016 | Davis | G06T 17/20 345/629 |
| 2016/0241864 A1* | 8/2016 | Loyd | H04N 21/4524 |
| 2016/0307602 A1* | 10/2016 | Mertens | G11B 27/031 |
| 2016/0358631 A1* | 12/2016 | Lee | G06F 1/163 |
| 2017/0124399 A1* | 5/2017 | Bostick | G06K 9/6254 |
| 2017/0178289 A1* | 6/2017 | Zhang | H04N 5/23296 |
| 2017/0229147 A1* | 8/2017 | McKaskle | H04N 21/4223 |
| 2017/0293971 A1* | 10/2017 | Dollens | G06Q 30/0601 |
| 2017/0295269 A1* | 10/2017 | Hosoi | H04R 1/1016 |
| 2017/0337692 A1* | 11/2017 | Romanenko | G06K 9/00201 |
| 2017/0359560 A1* | 12/2017 | Winn | H04N 5/23222 |
| 2018/0046866 A1* | 2/2018 | Lee | G06K 9/00993 |
| 2018/0067641 A1* | 3/2018 | Lerner | G10L 19/00 |
| 2018/0101731 A1* | 4/2018 | Shah | H04N 5/2628 |
| 2018/0160054 A1* | 6/2018 | Gandhi | H04N 21/4312 |
| 2018/0249168 A1* | 8/2018 | Loyd | H04N 21/4334 |
| 2018/0254065 A1* | 9/2018 | Chen | G11B 27/34 |
| 2018/0276845 A1* | 9/2018 | Bjorgvinsdottir | G06K 9/6265 |
| 2018/0338111 A1* | 11/2018 | Mourkogiannis | H04N 5/23238 |
| 2019/0007690 A1* | 1/2019 | Varadarajan | H04N 19/17 |
| 2019/0087690 A1* | 3/2019 | Srivastava | G06K 9/6262 |
| 2019/0139282 A1 | 5/2019 | Rathore et al. | |
| 2019/0017191 A1 | 6/2019 | Danielsson et al. | |
| 2019/0213420 A1* | 7/2019 | Karyodisa | G06K 9/6264 |
| 2019/0266980 A1* | 8/2019 | Kast | G06F 3/14 |
| 2019/0304102 A1* | 10/2019 | Chen | G06K 9/6271 |
| 2019/0304506 A1* | 10/2019 | Michaud | G11B 27/00 |

(56) References Cited

U.S. PATENT DOCUMENTS

| | | | |
|---|---|---|---|
| 2019/0306289 A1 | 10/2019 | Lee et al. | |
| 2019/0377586 A1* | 12/2019 | Faulkner | G06F 9/451 |
| 2020/0007921 A1* | 1/2020 | Ojala | H04N 13/161 |
| 2020/0020071 A1* | 1/2020 | Frey | G09G 5/373 |
| 2020/0034971 A1* | 1/2020 | Xu | G06T 7/11 |
| 2020/0059654 A1* | 2/2020 | Kelly | G10L 19/167 |
| 2020/0074738 A1* | 3/2020 | Hare | G06T 19/006 |
| 2020/0107038 A1* | 4/2020 | Loyd | H04N 19/46 |
| 2020/0186887 A1* | 6/2020 | Kwon | H04N 21/854 |
| 2020/0257436 A1 | 8/2020 | Yun et al. | |
| 2020/0402542 A1* | 12/2020 | Mourkogiannis | H04N 5/783 |
| 2021/0092323 A1 | 3/2021 | Brandt et al. | |

OTHER PUBLICATIONS

"U.S. Appl. No. 16/234,035, Response filed Feb. 27, 2020 to Non Final Office Action dated Nov. 29, 2019", 12 pgs.

"U.S. Appl. No. 16/234,035, Final Office Action dated Mar. 24, 2020", 22 pgs.

"U.S. Appl. No. 16/234,035, Notice of Allowance dated Jun. 8, 2020", 9 pgs.

"U.S. Appl. No. 16/234,035, Notice of Allowance dated Sep. 2, 2020", 12 pgs.

"U.S. Appl. No. 16/234,035, Response filed May 7, 2020 to Final Office Action dated Mar. 24, 2020", 11 pgs.

U.S. Appl. No. 16/234,035, U.S. Pat. No. 10,887,542, filed Dec. 27, 2018, Video Reformatting System.

U.S. Appl. No. 17/247,173, filed Dec. 2, 2020, Video Reformatting System.

"U.S. Appl. No. 17/247,173, Examiner Interview Summary dated Mar. 1, 2022", 3 pgs.

"U.S. Appl. No. 17/247,173, Final Office Action dated Apr. 8, 2022", 22 pgs.

"U.S. Appl. No. 17/247,173, Non Final Office Action dated Dec. 9, 2021", 18 pgs.

"U.S. Appl. No. 17/247,173, Response filed Mar. 9, 2022 to Non Final Office Action dated Dec. 9, 2021", 11 pgs.

"U.S. Appl. No. 17/247,173, Non Final Office Action dated Aug. 5, 2022", 25 pgs.

"U.S. Appl. No. 17/247,173, Response filed Jul. 8, 2022 to Final Office Action dated Apr. 8, 2022", 14 pgs.

"U.S. Appl. No. 17/247,173, Response filed Nov. 3, 22 to Non Final Office Action dated Aug. 5, 2022", 11 pgs.

"U.S. Appl. No. 17/247,173, Notice of Allowance dated Nov. 10, 2022", 9 pgs.

* cited by examiner

VIDEO REFORMATTING RECOMMENDATION

TECHNICAL FIELD

The present disclosure relates generally to video processing systems and more particularly to video reformatting systems.

BACKGROUND

Consumption of content on mobile devices continues to grow. Rather than watching a movie with a horizontal layout (having a 16:9 aspect ratio) or square layout (having a 1:1 aspect ratio), users now watch content with a vertical layout (e.g., having a 9:16 aspect ratio). Converting content from horizontal (landscape orientation) or square layout to vertical layout (portrait orientation) is not trivial and requires specialized software or hardware resources.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
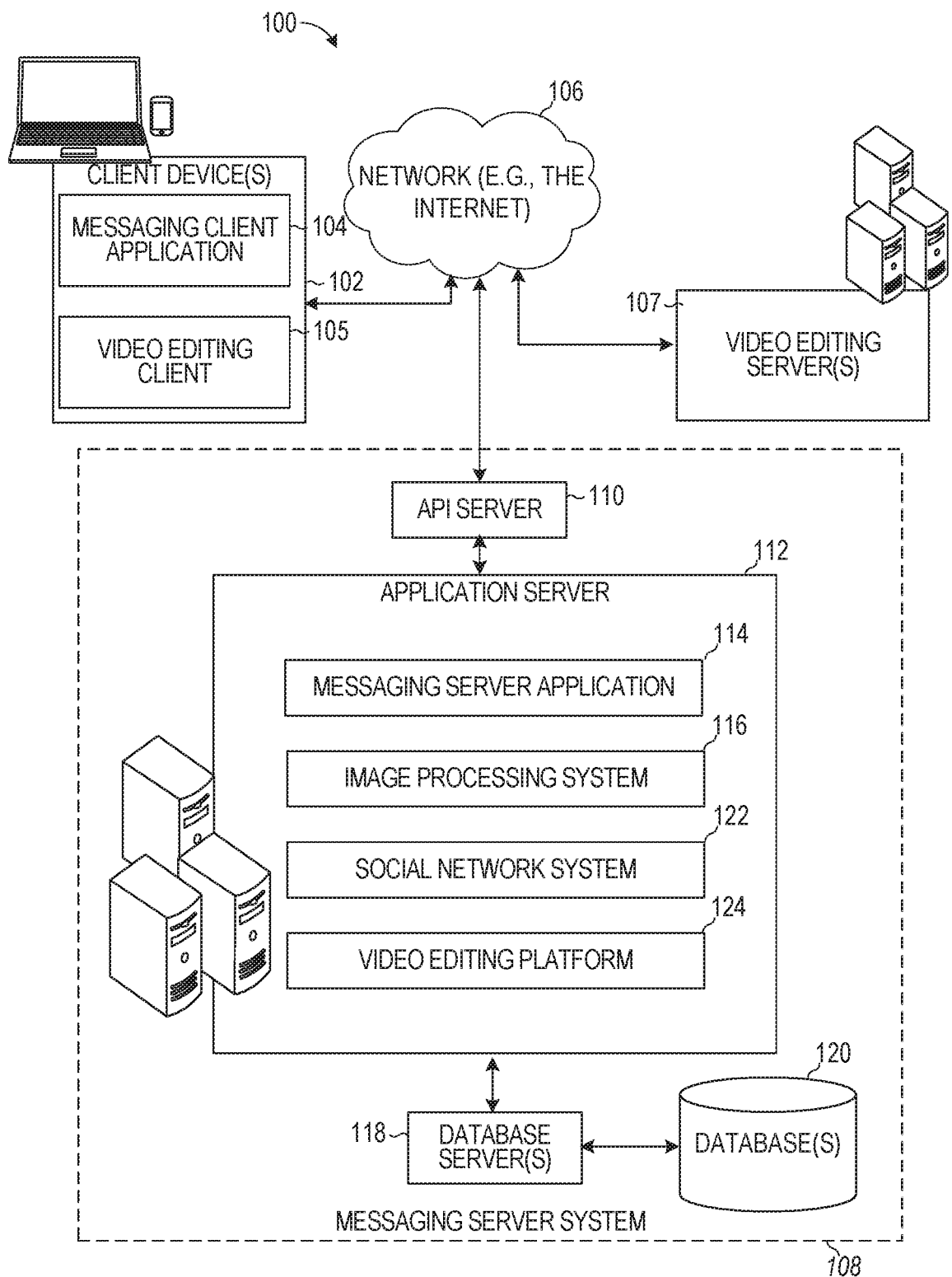
FIG. 1 is a block diagram showing an example messaging system for exchanging data (e.g., messages and associated content) over a network, according to example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

One of the challenges of distributing content produced in one aspect ratio (e.g., for display on a television) for display on devices having a different aspect ratio (e.g., mobile devices) is the need to reformat or edit the content to be specifically viewed on the mobile devices. This need arises because if the content, produced for consumption on a wide screen television, is presented as is f e.g., without any editing) on a mobile device with a vertical screen, the resulting images may be blurry, hard to see, and too small to enjoy. This negatively impacts the overall user experience.

Although conventional systems exist for reformatting the content, performing the reformatting in these systems requires professional video editor skills and is extremely time consuming, expensive and complicated. Also, the conventional systems require specialized software tools to be installed. In addition, even with the specialized software tools, any video editing that is performed has to be done manually on a frame-by-frame basis.

The disclosed embodiments improve the efficiency of using the electronic device by providing a video editing platform that automatically generates a modification for the way in which content is presented in a video for a user to review, for example, to make the content more suitable for consumption on a mobile device. For example, the disclosed video editing platform enables a content provider to review and accept an automatically generated modification to content from a horizontal or square layout to a vertical layout. In addition, rather than requiring specialized tools to be installed and learned in order to edit the content, the disclosed embodiments provide a web interface that automates and simplifies the process of reformatting the content by allowing the user to accept an automatically generated video modification with the push or selection of an on-screen option. This significantly improves how content providers make content available for consumption on mobile devices and reduces the number of steps the content providers have to perform to edit content for consumption on mobile devices. This is because the content provider is provided with a platform that not only automatically and intelligently generates a modification to the visual presentation of various one or more objects in a shot in the content to present the shot in a different layout (e.g., a vertical layout), but the platform also provides a web interface that allows the content provider to review and seamlessly, and with minimal effort, accept the automatically generated modification and/or make additional changes to the content. Rather than installing specialized software and manually analyzing content frame-by-frame to reformat the content for consumption on a mobile device, as done conventionally, only a few steps may be needed by the content provider to automatically reformat the content and review the automatically edited content before publication or distribution to viewers on mobile devices.

As an example, a content provider uploads, via a website, a video (e.g., an episode of a show) that has a horizontal aspect ratio to the disclosed video editing platform. The video editing platform automatically analyzes the video to detect a set of shots in the video. Each shot is a contiguous sequence$_{[GCG1]}$ of video frames that is free of cuts or transitions. Namely, the shot has image continuity across a sequence of frames that runs for an uninterrupted period of time without presenting a blank frame or other type of frame transition (e.g., a cut that combines two frames together, a fade (where a frame slowly turns black), dissolve (where a frame slowly disappears and another adjacent frame slowly appears), a wipe (where a frame slowly slides off the screen and an adjacent frame slides into the screen), and so forth) between the given sequence of frames.

After or during automatically detecting the shots in the video, the video editing platform identifies one or more objects (e.g., a human face and/or body) in each shot and automatically generates a modification to a visual presentation of the one or more objects in each shot (e.g., to be suitable for vertical display). For example, the video editing platform identifies two characters in the same shot and stacks the characters one on top of the other in a vertical window that has a vertical aspect ratio of the mobile device. In this way, rather than fitting the horizontal video in the vertical space of the mobile device by shrinking the horizontal video, the elements or objects in the frames of the horizontal video are automatically rearranged or repositioned to best use the available vertical screen space of the mobile device. In some implementations, in addition to or instead of generating the modification based on identified objects, the video editing platform performs automated modifications based on salient portions of the shot or portions of a shot where a user's eyes might focus or by identifying areas of sharp contrast. For example, the video editing platform identifies areas of dark/light contrast to detect which portions of the shot to keep or exclude. As another example, the video editing platform detects text in frames of the shot (e.g., a title of a movie in a set of frames) and adjusts the layout or visual presentation based on the text. Specifically, an introduction to a movie may, contain a title of the movie that spans the width of the shot. In such cases, the video editing platform performs a letterbox type of modification to the shot to keep the entire text in the shot.

In some implementations, to stack the characters one on top of the other, the video editing platform generates a vertical window having the vertical aspect ratio of the mobile device. The video editing platform copies the shot into upper and lower sections of the vertical window, positions a portion of the shot with the first character in the upper section and another portion of the shot with the second character in the lower section. The video editing platform then crops or removes content that is not within the upper and lower sections of the vertical window. The video editing platform then stores the modified shot and presents an indication of the modified shot to a user via the website to allow the user to accept the modification and publish or distribute the video with the modified shot to other viewers.

FIG. 1 is a block diagram showing an example messaging system 100 for exchanging data (e.g., messages and associated content) over a network 106. The messaging system 100 includes multiple client devices 102, each of which hosts a number of applications including a messaging client application 104 and a video editing client 105. Each messaging client application 104 is communicatively coupled to other instances of the messaging client application 104, video editing client 105, and a messaging server system 108 via a network 106 (e.g., the Internet).

Accordingly, each messaging client application 104 and video editing client 105 is able to communicate and exchange data with another messaging client application 104 and video editing client 105 and with the messaging server system 108 via the network 106. The data exchanged between messaging client applications 104, video editing clients 105, and between a messaging client application 104 and the messaging server system 108 includes functions (e.g., commands to invoke functions) as well as payload data (e.g., text, audio, video, or other multimedia data).

Video editing client 105 is an application that includes a set of functions that allow the client device 102 to access video editing server 107 and/or video editing platform 124. Video editing client 105 accesses the video editing platform 124 and functionality of video editing server(s) 107 through a dedicated client application or a web interface. For example, video editing client 105 implements a local client application that acts as a dumb terminal with minimal functionality used to access video editing features by communicating directly with the video editing platform 124. As another example, video editing client 105 accesses the video editing features of the video editing platform 124 by accessing a website hosted by video editing server(s) 107. In such cases, the video editing client 105 communicates with video editing server(s) 107 to upload a video for editing via a website and then video editing server(s) 107 sends the video received from the client to the video editing platform 124 for automated editing. In some implementations, the functions provided by video editing server(s) 107 can be implemented by and combined with the video editing platform 124.

In some embodiments, the video editing client 105 is used by a content provider to reformat content that has been previously produced for consumption on a wide screen or square screen device (e.g., content produced for presentation in a landscape orientation). Namely, the content may be in a first aspect ratio (for presentation in a landscape orientation) and the video editing client 105 communicates with the video editing platform 124 to reformat the content into a second aspect ratio suitable for presentation in a portrait orientation on a screen of a mobile device, in some instances changing the orientation of the image from landscape to portrait orientation in reformatting. For example, the video editing client 105 presents a story studio interface that includes an option to create a new episode of a show. In response to receiving a user selection of a new episode option, the video editing client 105 presents a user with an upload interface. The user can select an upload option which allows the user to select one or more files that include the target video to be uploaded and reformatted. After the user selects the file that includes the target video, the video editing client 105 asynchronously uploads the file to the video editing platform 124. Video editing platform 124 receives the file and automatically reformats the file (e.g., in the manner discussed in connection with FIGS. 5 and 6).

After the video editing platform 124 automatically reformats the presentation of the video from the first aspect ratio to the second aspect ratio (e.g., the vertical aspect ratio), the video editing platform 124 presents an editing screen to the video editing client 105. An illustrative editing screen is shown and described in connection with FIG. 7 below. In some embodiments, the editing screen is presented to the user as the automated editing of each shot completes and while other shots continue to be automatically edited. A spinner may be shown to the user to indicate that other shots are still being processed in the editing screen. In some cases, the chapters represented in the editing screen correspond to 20 second media files, but any other suitable length media file can be used. In some cases, the chapters represent separate shots, a collection of shots that are thematically related, a collection of shots related to the same scene, a collection of 20 second media files that correspond to the same shot, and so forth.

The editing screen allows a user to see how the video was divided into shots and chapters, review the automatically generated edits, and make further changes. For example, a user can split shots, combine shots, create new chapters, assign titles to the shots and chapters, change the visual presentation of the content in the shots, and so forth. The user can also add graphics and text to the shots presented in the video editing platform 124. After the user is satisfied with the edited content, the user can select a publish option in the video editing client 105 to instruct the video editing platform 124 to make the episode available for consumption by other users on their respective mobile devices (e.g., for selection by any user of the messaging client application 104).

In some implementations, the video editing platform 124 automatically generates a modification that reformats the presentation of the video. The generated modification is presented to the user in the form of an indication in the editing screen. The indication of the automatically generated modification for a given shot is presented to the user in the editing screen in response to receiving a user selection of a representation of the shot. The indication informs the user about how the video editing platform 124 automatically generated the modification. After the user reviews the contents of the automatically generated modification, the user can select an accept option to cause the video editing platform 124 to modify the shot according to the automatically generated modification. The modified shot can replace the unmodified shot in the storage and/or can be stored as a separate file that includes the modified shots. The modified shots can be assembled into a sequence of modified shots and distributed to a plurality of users for consumption. In an implementation, the automatically generated modification corresponds to a modification of one of several layers in the video. The user can review each layer modification and accept the automatically generated modification for each layer (e.g., a video frame layer, a text layer, an audio layer, and so forth). In some implementations, the user can select an option to accept all the modifications generated for multiple layers in a shot simultaneously. In response, the layers of the shot are combined into a single file to be played back together.

In some embodiments, rather than generating new video files as the modifications of the video, a textual document (e.g., an XML or JSON) can be generated to represent modifications to a video file. The textual document can identify time codes of frames and shots of the video file and can specify x,y positions of the vertical window and types of layouts for each time code. The textual document can be automatically generated and modified by a user. After the textual document is complete, a user can select an option to apply the edits described in the textual document to the corresponding video file. The video file is modified according to the layouts in the textual document and presented to a user.

In one example, the automatically generated modification of the video editing platform 124 includes identifying a particular object in a frame that is static throughout a predetermined number of consecutive frames in the shot and generating a modification that statically crops the object in using a vertical window. In another example, the automatically generated modification of the video editing platform 124 includes identifying text boxes that span most of the width a predetermined number of consecutive frames in a shot (e.g., a long horizontal shot (like a title screen)), and rather than performing a static crop using a vertical window, the video editing platform 124 crops the frames using a letterbox-sized window. In this case, the video editing platform 124 is configured to identify the dominant cover in the shot so as to preserve the framing colors in the letterbox window.

Each messaging client application 104 and video editing client 105 is also able to communicate with one or more video editing server(s) 107 and/or video editing platform 124. Video editing platform 124 receives a video in a first aspect ratio (e.g., a horizontally elongated aspect ratio (typically 16:9) or a 1:1 square aspect ratio) and automatically alters the objects and images in the presentation of the video to create a modified video that is in a second aspect ratio that is vertically elongated (e.g., a 9:16 aspect ratio).

To perform this automated operation, the video editing platform 124 initially processes the received video to identify one or more shots in the video. For example, the video editing platform 124 accesses each frame in the video to determine when a transition occurs (e.g., when a blank frame is present or when a frame corresponding to a predetermined transition is detected). Once the transition is identified, the video editing platform 124 searches for when the next occurrence of a transition takes place without any other intervening transitions. The video editing platform 124 marks the set of contiguous frames between the two identified transitions as a shot in the video. The video editing platform 124 continues performing this process to identify all the contiguous frames that occur between respective transitions as corresponding to respective shots.

In some cases, the video editing platform 124 selects the first, middle, or last one of the frames in a given shot or an arbitrary random frame in the shot to represent the shot in an editing screen. Namely, the video editing platform 124 can present an icon or visual representation that includes a reduced horizontal version of the selected frame as a representation of the shot that includes the contiguous set of frames including the selected frame. The user can use the editing screen to select the icon or visual representation to view a preview of the shot that has been modified and to receive an indication of the automatically generated modification to the frames and/or layers in the shot.

The video editing platform 124 identifies one or more objects of interest (e.g., a subject such as a human face) in each of the shots that are marked. Based on the number of objects that are detected in a given shot and whether the objects are moving, the video editing platform 124 automatically generates a modification of the shot by rearranging the presentation of the objects into a vertical arrangement using a vertical window that has the vertical aspect ratio. For example, if a single non-moving object is detected, the video editing platform 124 aligns the object within the vertical window and crops content from the frames of the shot featuring the object that are outside of the vertical window to remove the content that is outside of the window. As another example, if the single object moves throughout the shot, the video editing platform 124 aligns the vertical window over the object and pans the window in the direction in which the object moves while cropping content that is outside of the window as the window pans to remove the cropped content. As another example, if two objects are detected in the shot, the video editing platform 124 stacks one of the objects on top of the other in the vertical window that has the vertical aspect ratio.

In some embodiments, the video editing platform 124 detects the orientation of the device being used to consume the content and performs the automatic reformatting based on the orientation. For example, if the device is oriented horizontally (e.g., where the width of the screen is longer than the height of the screen), the video editing platform 124 presents to the user the content in its original form (e.g., in the landscape orientation). In response to detecting that the device orientation has changed to a vertical orientation (e.g., to a portrait orientation where the width of the screen is shorter than the height) (which may happen while the content is being consumed), the video editing platform 124 automatically generates and/or retrieves a vertical layout or portrait orientation of the content (e.g., where one object is stacked on top of another) and presents that reformatted content on the vertically oriented screen. These processes are described in more detail below in connection with FIG. 6 and in commonly-owned, commonly-assigned Ian Wehrman et al., U.S. patent application Ser. No. 16/234,035, filed Dec. 27, 2018, entitled "VIDEO REFORMATTING SYSTEM," which is hereby incorporated by reference.

After or during the generation of the modification of the video, the video editing platform 124 presents an editing screen to a user on a client device 102 to enable the user to make further adjustments and edits to the automatically edited video and for the user to receive indications of the automatically generated modifications.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy, certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, virtual objects, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an application program interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the API server 110, this server 110 receives and transmits message data (e.g., commands and message payloads) between the client device 102 and the application server 112. Specifically, the API server 110 provides a set of interfaces (e.g., routines and protocols) that can be called or queried by the messaging client application 104 and the video editing server 107 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to the messaging server application 114, and for possible access by another messaging client application 104; the setting of a collection of media data (e.g., story); the retrieval of such collections; the retrieval of a list of friends of a user of a client device 102; the retrieval of messages and content; the adding and deleting of friends to a social graph; the location of friends within a social graph; access to user conversation data; access to avatar information stored on messaging server system 108; and opening an application event (e.g., relating to the messaging client application 104).

The application server 112 hosts a number of applications and subsystems, including a messaging server application 114, an image processing system 116, a social network system 122, and video editing platform 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114. A portion of the image processing system 116 may also be implemented by video editing platform 124.

The social network system 122 supports various social networking functions and services and makes these functions and services available to the messaging server application 114. To this end, the social network system 122 maintains and accesses an entity graph 204 (FIG. 2) within the database 120. Examples of functions and services supported by the social network system 122 include the identification of other users of the messaging system 100 with which a particular user has relationships or is "following" and also the identification of other entities and interests of a particular user. Such other users may be referred to as the user's friends.

The application server 112 is communicatively coupled to a database server 118, which facilitates access to a database 120 in which is stored data associated with messages processed by the messaging server application 114.

Figure 2:
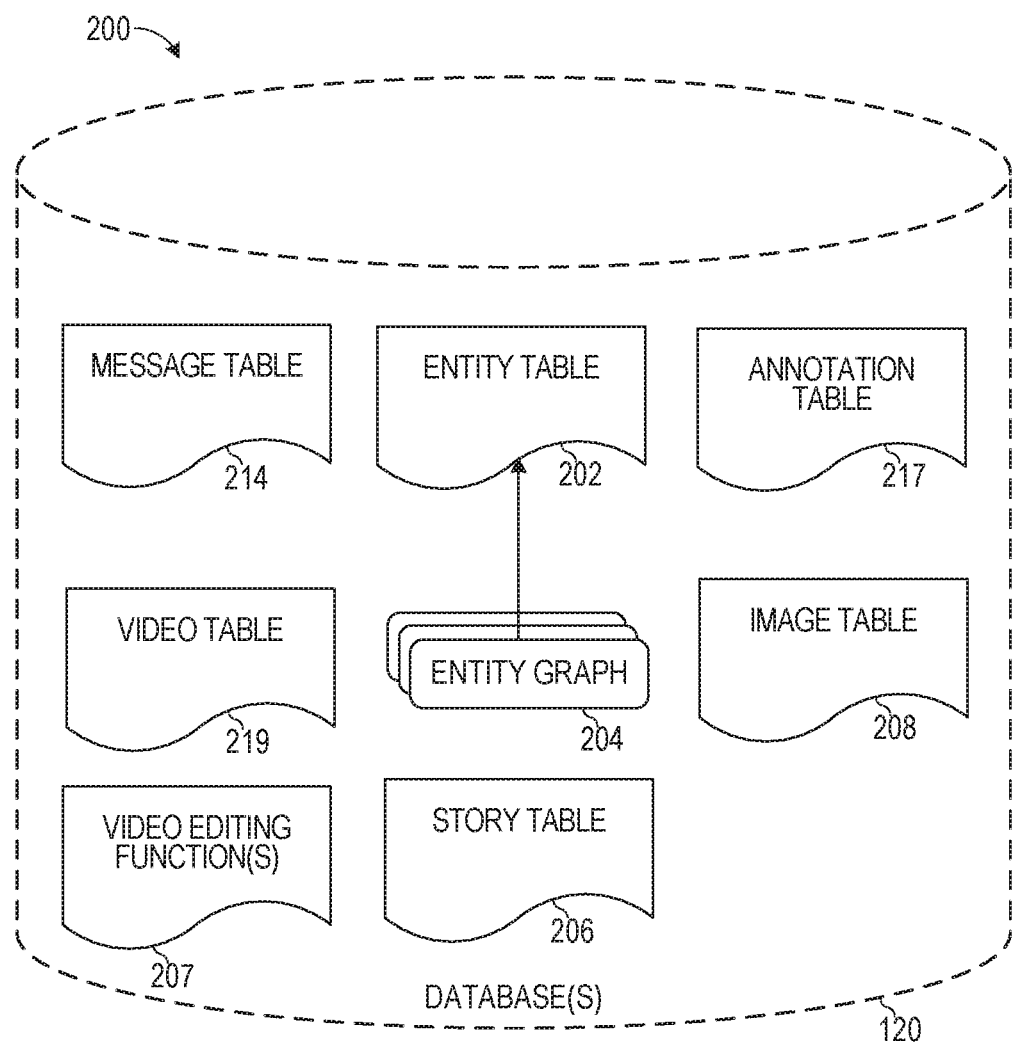
FIG. 2 is a schematic diagram illustrating data that may be stored in the database of a messaging server system, according to example embodiments.

FIG. 2 is a schematic diagram 200 illustrating data, which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 214. An entity table 202 stores entity data, including an entity graph 204. Entities for which records are maintained within the entity table 202 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 204 furthermore stores information regarding relationships and associations between entities. Such relationships may be social, professional (e.g., work at a common corporation or organization), interest-based, or activity-based, merely for example.

Message table 214 may store a collection of conversations between a user and one or more friends or entities. Message table 214 may include various attributes of each conversation, such as the list of participants, the size of the conversation (e.g., number of users and/or number of messages), the chat color of the conversation, a unique identifier for the conversation, and any other conversation related feature(s). Information from message table 214 may be provided in limited form and on a limited basis to a given web-based gaming application based on functions of the messaging client application 104 invoked by the web-based gaming application.

The database 120 also stores annotation data, in the example form of filters, in an annotation table 217. Database 120 also stores annotated content received in the annotation table 217. Filters for which data is stored within the annotation table 217 are associated with and applied to videos (for which data is stored in a video table 219) and/or images (for which data is stored in an image table 208). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a UI by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include current temperature at a specific location, a current speed at which a sending user is traveling, battery life for a client device 102, or the current time.

Other annotation data that may be stored within the image table 208 is so-called "lens" data. A "lens" may be a real-time special effect and sound that may be added to an image or a video.

As mentioned above, the video table 219 stores video data which, in one embodiment, is associated with messages for which records are maintained within the message table 214. Similarly, the image table 208 stores image data associated with messages for which message data is stored in the entity table 202. The entity table 202 may associate various annotations from the annotation table 217 with various images and videos stored in the image table 208 and the video table 219.

Figure 7:
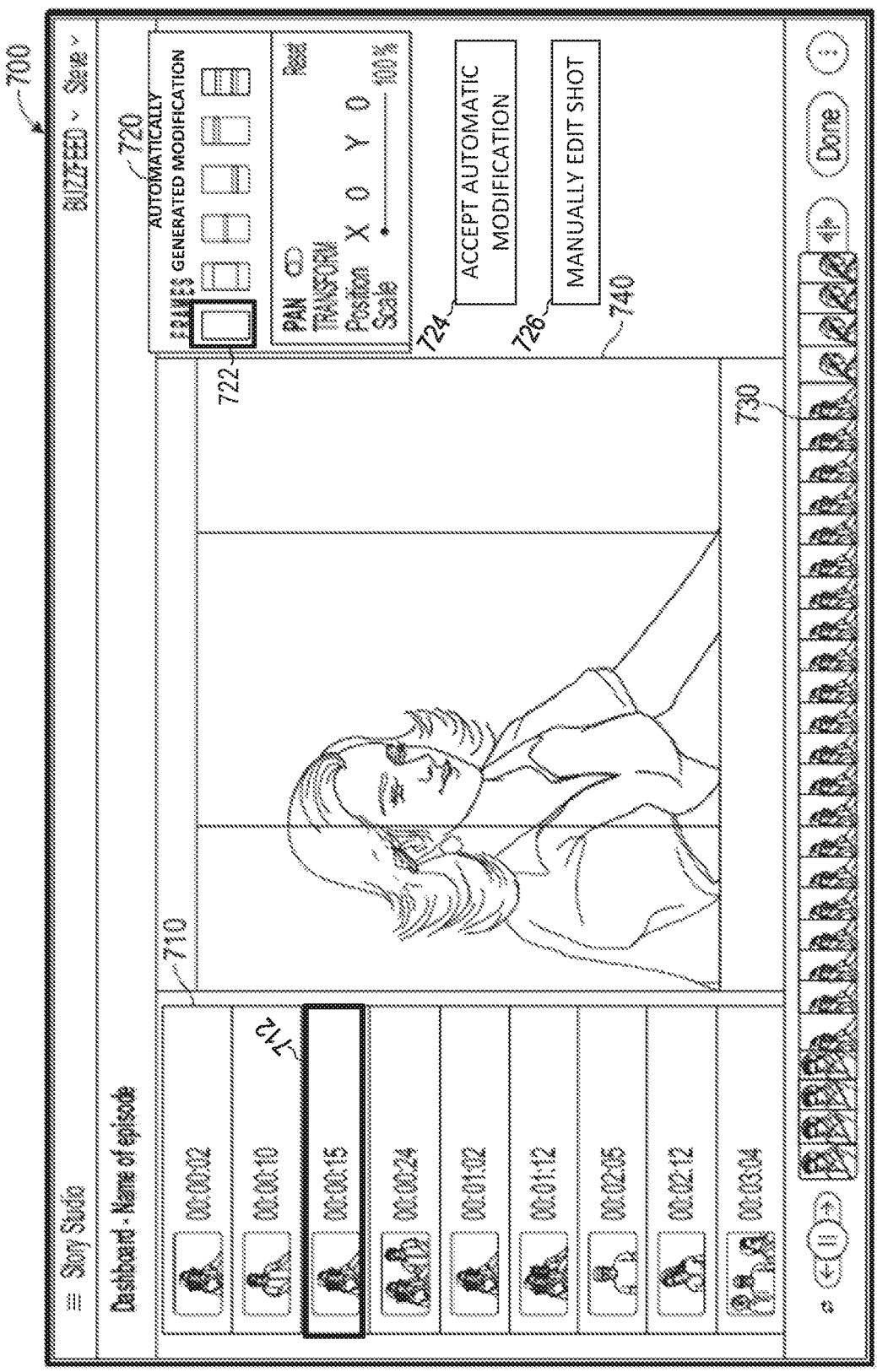
FIGS. 7-8 are illustrative user interfaces of the video editing platform, according to example embodiments.

Video editing functions 207 stores video editing functions of the video editing platform 124. Video editing functions 207 provide any one or more of the functions corresponding to the options presented to the user in the video editing screen 700 (FIG. 7). Video editing functions 207 provide the algorithms and processes the video editing platform 124 uses to identify shots, identify, objects of interest, select a new arrangement or layout for the identified objects, and so forth.

A story table 206 stores data regarding collections of messages and associated image, video, or audio data, which are compiled into a collection (e.g., a story or a gallery). The creation of a particular collection may be initiated by a particular user e.g., each user for which a record is maintained in the entity table 202). A user may create a "personal story" in the form of a collection of content that has been created and sent/broadcast by that user. To this end, the UI of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices 102 have location services enabled and are at a common location event at a particular time may, for example, be presented with an option, via a UI of the messaging client application 104, to contribute content to a particular live story. The live story may be identified to the user by the messaging client application 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

A further type of content is known as a "show." A show includes one or more episodes that are arranged to be viewed in a particular sequence. Each episode may be 15 minutes in length but can also be shorter or longer. A user accesses a given episode from a discover screen of the messaging application on a mobile device. In the discover screen of the messaging application, various representations (icons) of different shows are provided. A user selects a given icon for a show and the system presents a list of episodes of the show that are available for the user to watch. After a user selects one of the episodes, the system retrieves the corresponding episodes and plays the episode back for the user on the mobile device. The episodes of the show, in certain embodiments, are specifically formatted for display on a vertical screen of a mobile device. According to some embodiments, a content provider supplies or uploads a given episode of a show that has a horizontal aspect ratio (e.g., is formatted for display on a horizontal screen) and the video editing platform 124 reformats the episode into a vertical aspect ratio for display on a mobile device. The reformatted episode is the one that is made available through the discover screen of the messaging application on the mobile device.

Figure 3:
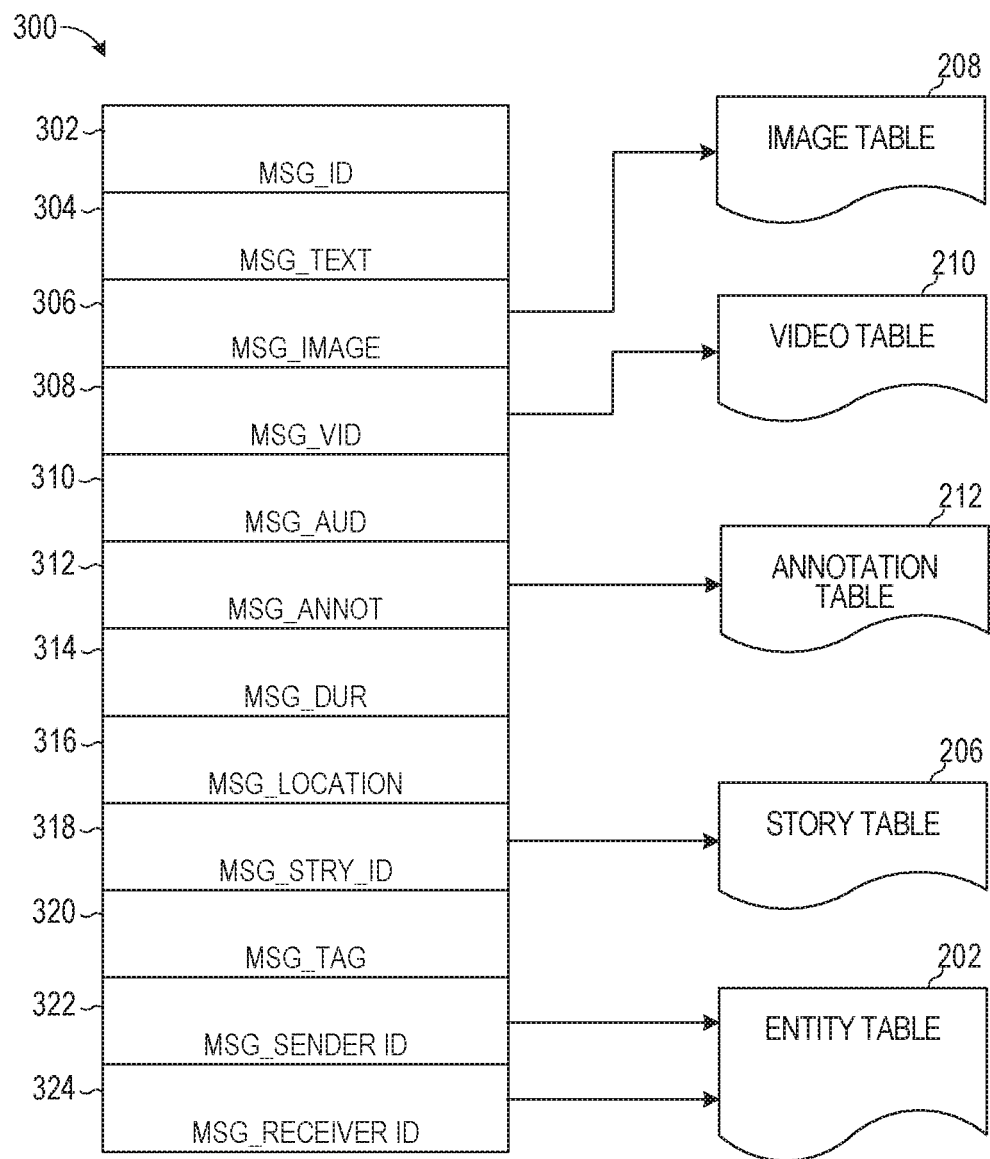
FIG. 3 is a schematic diagram illustrating a structure of a message generated by a messaging client application for communication, according to example embodiments.

FIG. 3 is a schematic diagram illustrating a structure of a message 300, according to some embodiments, generated by a messaging client application 104 for communication to a further messaging client application 104 or the messaging server application 114. The content of a particular message 300 is used to populate the message table 214 stored within the database 120, accessible by the messaging server application 114. Similarly, the content of a message 300 is stored in memory as "in-transit" or "in-flight" data of the client device 102 or the application server 112. The message 300 is shown to include the following components:

A message identifier 302: a unique identifier that identifies the message 300.

A message text payload 304: text, to be generated by a user via a UI of the client device 102 and that is included in the message 300.

A message image payload 306: image data, captured by a camera component of a client device 102 or retrieved from memory of a client device 102, and that is included in the message 300.

A message video payload 308: video data, captured by a camera component or retrieved from a memory component of the client device 102 and that is included in the message 300.

A message audio payload 310: audio data, captured by a microphone or retrieved from the memory component of the client device 102, and that is included in the message 300.

A message annotation 312: annotation data (e.g., filters, stickers, or other enhancements) that represents annotations to be applied to message image payload 306, message video payload 308, or message audio payload 310 of the message 300.

A message duration parameter 314: parameter value indicating, in seconds, the amount of time for which content of the message (e.g., the message image payload 306, message video payload 308, message audio payload 310) is to be presented or made accessible to a user via the messaging client application 104.

A message geolocation parameter 316: geolocation data (e.g., latitudinal and longitudinal coordinates) associated with the content payload of the message 300. Multiple message geolocation parameter 316 values may be included in the payload, with each of these parameter values being associated with respect to content items included in the content (e.g., a specific image within the message image payload 306, or a specific video in the message video payload 308).

A message story identifier 318: identifier value identifying one or more content collections (e.g., "stories") with which a particular content item in the message image payload 306 of the message 300 is associated. For example, multiple images within the message image payload 306 may each be associated with multiple content collections using identifier values.

A message tag 320: each message 300 may be tagged with multiple tags, each of which is indicative of the subject matter of content included in the message payload. For example, where a particular image included in the message image payload 306 depicts an animal (e.g., a lion), a tag value may be included within the message tag 320 that is indicative of the relevant animal. Tag values may be generated manually, based on user input, or may be automatically generated using, for example, image recognition.

A message sender identifier 322: an identifier (e.g., a messaging system identifier, email address, or device identifier) indicative of a user of the client device 102 on which the message 300 was generated and from which the message 300 was sent.

A message receiver identifier 324: an identifier (e.g., a messaging system identifier, email address, or device identifier) indicative of user(s) of the client device 102 to which the message 300 is addressed. In the case of a conversation between multiple users, the identifier may indicate each user involved in the conversation.

The contents (e.g., values) of the various components of message 300 may be pointers to locations in tables within which content data values are stored. For example, an image value in the message image payload 306 may be a pointer to (or address of) a location within an image table 208. Similarly, values within the message video payload 308 may point to data stored within a video table 219, values stored within the message annotations 312 may point to data stored in an annotation table 217, values stored within the message story identifier 318 may point to data stored in a story table 206, and values stored within the message sender identifier 322 and the message receiver identifier 324 may point to user records stored within an entity table 202.

Figure 4:
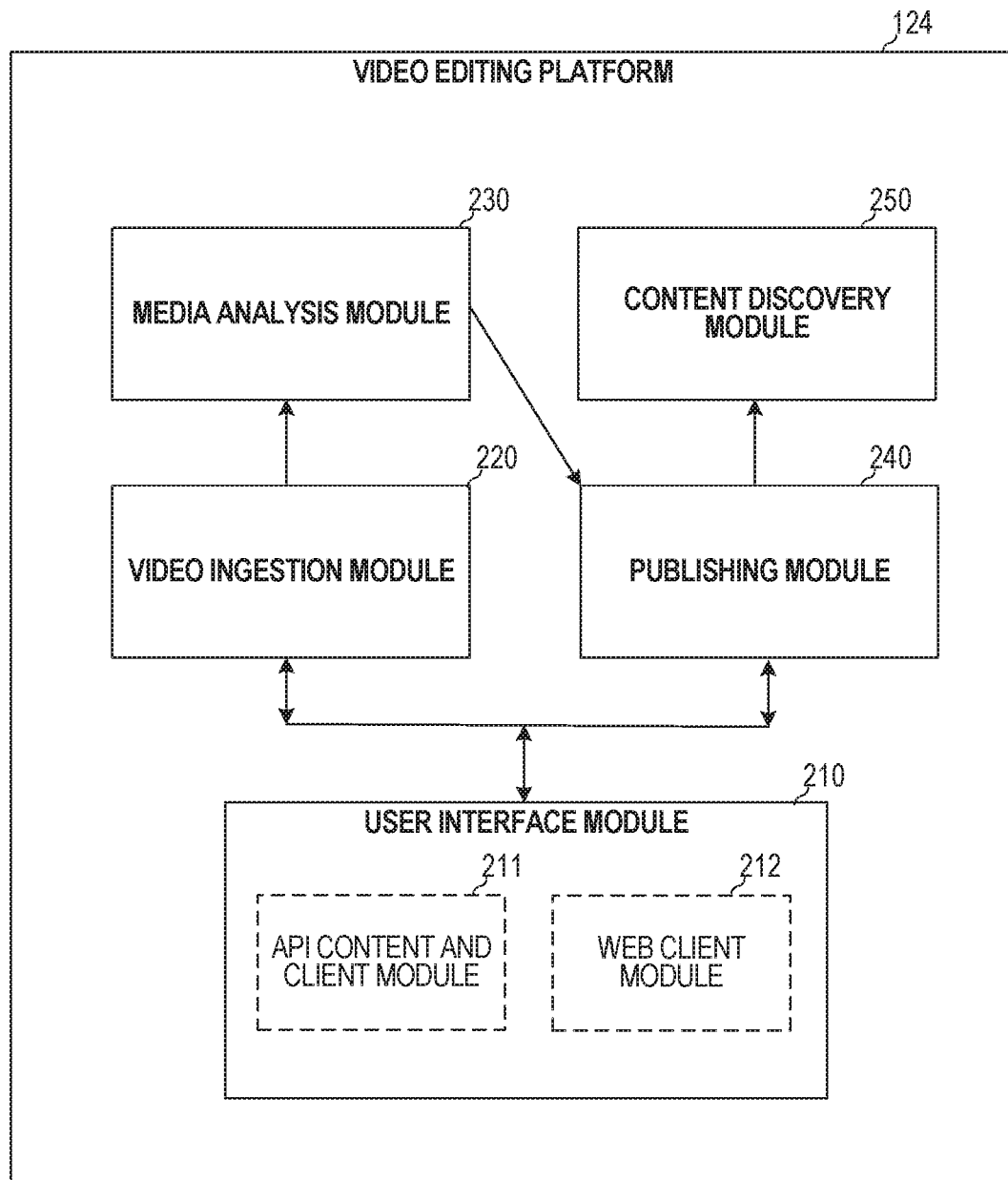
FIG. 4 is a block diagram showing an example video editing platform, according to example embodiments.

FIG. 4 is a block diagram showing an example video editing platform 124, according to example embodiments. Video editing platform 124 includes a user interface module 210, a video ingestion module 220, a media analysis module 230, a publishing module 240 and a content discovery module 250. User interface module 210 may include an API content and client module 211 and a web client module 212. User interface module 210 is configured to communicate with a client device 102 to receive a video in a first aspect ratio (e.g., a wide or square aspect ratio) for automatically generating a modification for converting the video to a second aspect ratio (e.g., a vertical aspect ratio). The user interface module 210 provides the client device 102 with the automatically generated modification of the edited video via a video editing screen 700 to allow the user to accept the modification and/or make additional manual edits to the video. The user interface module 210 receives input from the client device 102 instructing the video editing platform 124 to publish a given edited video for public distribution (e.g., via the messaging client application 104).

In some cases, the client device 102 communicates with the video editing platform 124 via a dedicated dumb terminal that has software with minimal communication and display capabilities. In such cases, the client device 102 communicates directly with the video editing platform 124 via the API content and client module 211. In some cases, the client device 102 communicates with the video editing platform 124 via a website hosted by video editing server(s) 107. In such cases, the client device 102 communicates with the video editing platform 124 via the web client module 212 that communicates with the video editing server(s) 107.

The user interface module 210 provides a video that was received from the client device 102 to the video ingestion module 220. The video ingestion module 220 analyzes the video from front to back (e.g., from the first frame to the last frame) to identify shot boundaries (e.g., to detect which contiguous set of frames are between respective video transitions). The video ingestion module 220 extracts and stores high and low resolution video frames for final rendering and for fast analysis and to generate chunks of transcoded video optimized for playback on a mobile device. In some cases, the video ingestion module 220 outputs shots that are no longer than 20 seconds in length or that are no longer than a specified threshold. It the video ingestion module 220 fails to detect a transition after 20 seconds or after the specified threshold, the video ingestion module 220 automatically inserts an artificial transition to generate an artificial shot. For example, the video ingestion module 220 detects a first transition at time point 1:30 (min:sec) and fails to detect a transition 20 seconds later at 1:50 (min:sec). In such cases, the video ingestion module 220 creates a shot that has the set of frames between 1:30 and 1:50 even though a transition was not detected at the 1:50 time point.

The video ingestion module 220 also adds chapter breaks at the shot boundaries. For example, chapter breaks are added as close as possible to 20 seconds after the previous shot boundary or after the start of the video. In some implementations, the video ingestion module 220 adds a chapter break after a specified or predetermined number of shots (e.g., after every 4 shots).

Once the shot boundary (e.g., the shot) is identified, the low resolution frames of the shot are provided by the video ingestion module 220 to the media analysis module 230. Media analysis module 230 performs a variety of low-level analyses on the shot including saliency analysis, sharp contrast analysis, crop suggestion, face detection, text detection, and dominant color analysis. Media analysis module 230 performs operations discussed in connection with FIGS. 5 and 6 to generate modifications and/or recommendations to a user to reformat the layout of the content in the frames into a different arrangement (e.g., a vertical arrangement). For example, the media analysis module 230 combines the low level analyses as they become available along with some heuristics to produce recommended layouts and formatting parameters for each shot. The available layouts (e.g., full frame, letterbox, two-way split, three-way split, and so forth) are ranked and formatting parameters appropriate to each layout are recommended. For example, the scale and position for the full-frame layout, scale and background color for letterbox, split ratio, and position for two-way or three-way split layouts are recommended. The media analysis module 230 obtains the top-ranked layout and associated formatting parameters for each shot and presents the layout as an indication to the user of the recommended automatically generated modification for the user to accept for final rendering via a publishing module 240 that presents the recommendations to a user via the user interface module 210 in a video editing screen 700 (FIG. 7).

After the user confirms or makes additional changes to the edited shots, the user can select a publish option to instruct the publishing module 240 to make the edited video available to other users. In an example, the publishing module 240 provides the reformatted video (the video with the vertical aspect ratio) to the content discovery module 250. The content discovery module 250 presents an option to access the video as an episode option to users of a given application (e.g., a messaging application). In response to receiving a user selection of the episode option, the reformatted video is presented to the given user in the vertical aspect ratio.

In some embodiments, the edited video is stored as a new video that is additional to the video that is in the horizontal or square aspect ratio. This way, if a different set of changes is desired, the horizontal or vertical video can be accessed and edited into a new video for publication to other users. In some embodiments, the edited video replaces the horizontal or square aspect ratio video that is received.

In some embodiments, the edited video is composed of multiple layers. One layer includes the video frames that are in the vertical aspect ratio. Another layer includes audio corresponding to the video frames. Another layer includes textual or image content that overlays frames in the video. Each layer can be edited automatically or manually by the user independently of another layer. After editing all of the layers is completed, a user can select a publish option to instruct the publishing module 240 to combine all of the layers into a single video content. In this way, the audio layer is presented together in time with the video frame layer and the textual or image content layer. The single video content is provided as a single file to a client device to present to a user.

Figure 5:
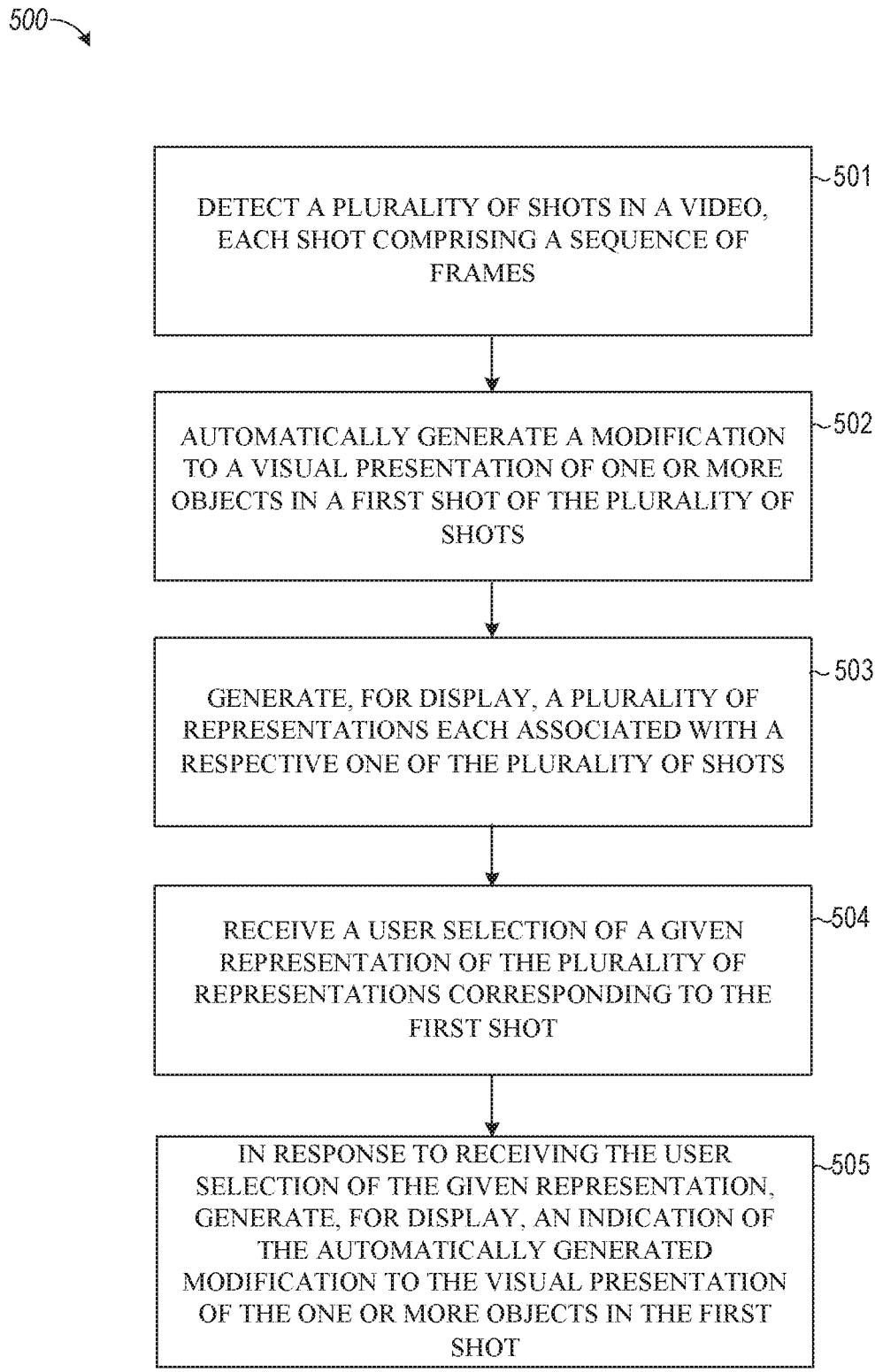
FIGS. 5-6 are flowcharts illustrating example operations of the video editing platform, according to example embodiments.
Figure 6:
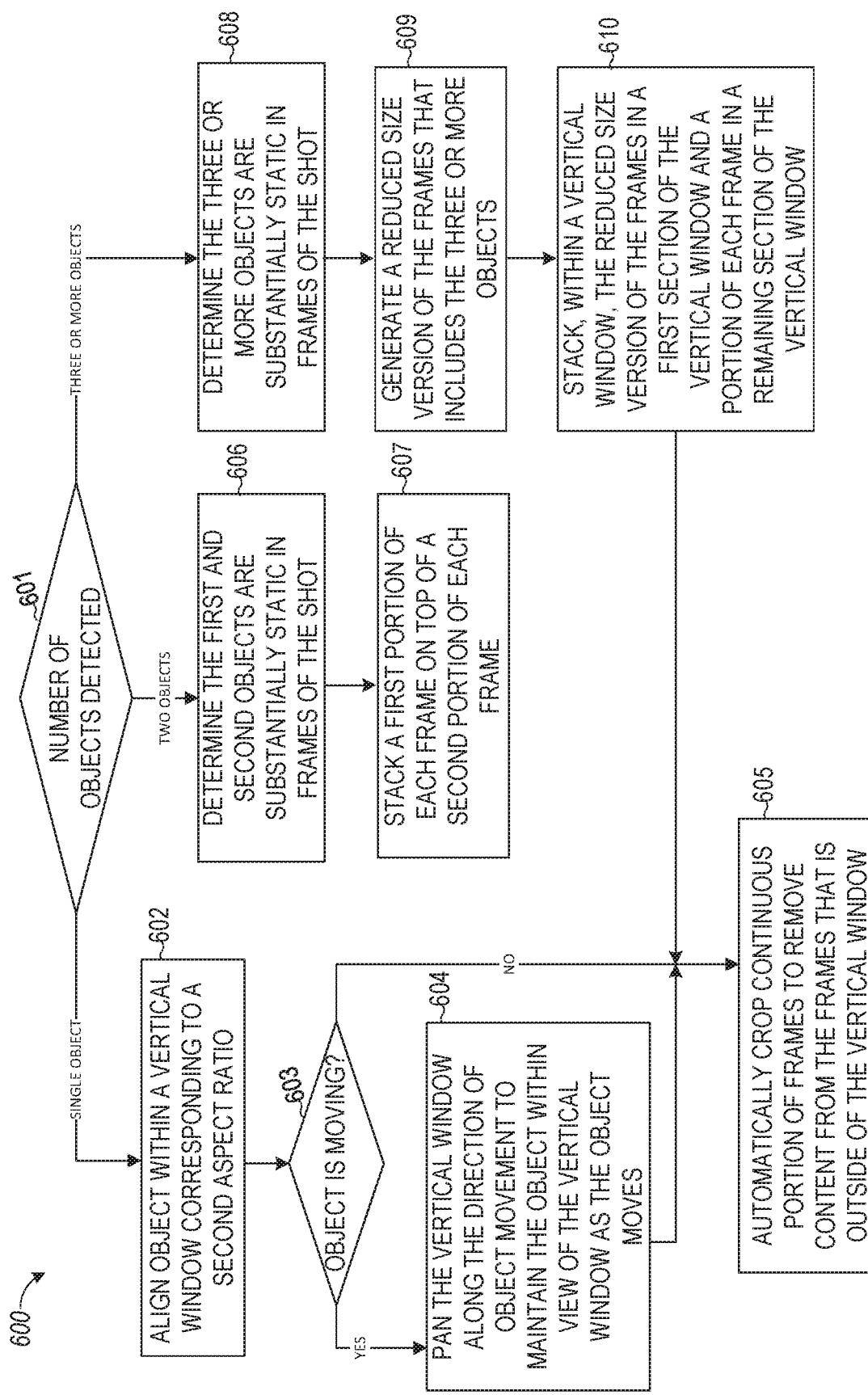

FIGS. 5-6 are flowcharts illustrating example operations of the video editing platform 124 in performing processes 500-600, according to example embodiments. The processes 500-600 may be embodied in computer-readable instructions for execution by one or more processors such that the operations of the processes 500-600 may be performed in part or in whole by the functional components of the messaging server system 108; accordingly, the processes 500-600 are described below by way of example with reference thereto. However, in other embodiments at least some of the operations of the processes 500-600 may be deployed on various other hardware configurations. The processes 500-600 are therefore not intended to be limited to the messaging server system 108 and can be implemented in whole, or in part, by any other component.

At operation 501, the video editing platform 124 detects a plurality of shots in a video, each shot comprising a sequence of frames. For example, the video ingestion module 220 processes a low-resolution version of the received video to detect video transitions (e.g., a blank frame). Upon detecting a first video transition, the video ingestion module 220 searches for the immediately adjacent next video transition (e.g., the next blank frame). In some cases that next video transition is detected less than 20 seconds after the first video transition. Upon detecting the next video transition, the video ingestion module 220 identifies the set of contiguous frames that are adjacent to the two video transitions and marks the contiguous frames as a shot. After finding one shot, the video ingestion module 220 searches for the next video transition and marks the set of contiguous frames between the next set of transitions as another shot. For example, the video ingestion module 220 identifies a first video transition at timepoint 1:20 (min:sec) and a second video transition at timepoint 1:30 (min:sec). In response, the video ingestion module 220 marks a first set of contiguous frames between timepoints 1:20 and 1:30 as corresponding to a given shot. Next, the video ingestion module 220 detects another video transition at timepoint 1:45 following the video transition at timepoint 1:30. In response, the video ingestion module 220 marks a second set of contiguous frames between timepoints 1:30 and 1:45 as corresponding to another shot. In some cases, the video ingestion module 220 selects a given frame (first, middle or last) in each marked shot to represent the shot in a video editing screen 700 as an icon or visual representation.

At operation 502, the video editing platform 124 automatically generates a modification to a visual presentation of one or more objects in a first shot of the plurality of shots. For example, the media analysis module 230 processes the low-resolution shots provided by the video ingestion module 220 to detect one or more objects that appear in the shot continuously or among a majority of the frames in the shot. In some cases, the video editing platform 124 performs facial recognition to detect human faces in the shot as the one or more objects. The media analysis module 230 focuses a vertical window (having a vertical aspect ratio of 9:16) around the object in the shot and crops out to remove any content in the shot that is outside of the vertical window. As another example, the media analysis module 230 places objects that appear next to each other in the received video on top of each other within the vertical window. Specifically, two humans that are facing each other in the video that is in the first aspect ratio are instead automatically placed on top of each other in the vertical window to fit within the vertical aspect ratio, and other content outside of the vertical window is removed. This automatically generated modification is stored and/or associated with the first shot. In this way, in response to receiving a user selection of the first shot, the automatically generated modification is presented to the user as an indication for the user to accept.

FIG. 6 provides an illustrative process 600 for automatically generating modifications to the visual presentation of one or more objects in the first shot. In an embodiment, the operations discussed in connection with FIG. 6 are performed to determine a type of modification to perform for a given shot or set of shots. These determined modifications are stored as instructions for performing the modifications and are presented to the user as an indication of the modifications for a given shot. Upon receiving a user selection of a confirm or accept option, the modification instructions are retrieved to perform the operations of FIG. 6 to modify the shot. At operation 601, the video editing platform 124 determines the number of objects that are detected. In response to determining that there is a single object detected in the shot, the process 600 proceeds to operation 602. In response to determining that two objects are in the shot, the process 600 proceeds to operation 606. In response to determining that three or more objects are in the shot, the process 600 proceeds to operation 608.

At operation 602, the video editing platform 124 aligns the object within a vertical window corresponding to a second aspect ratio. For example, the media analysis module 230 obtains a vertical window that has a target aspect ratio (e.g., a vertical aspect ratio of 9:16). The media analysis module 230 determines the position of the detected object in the frames of the shot and places the obtained window on top of the object so that the object is centered in the window. The window may have the same height as the frames in the shot but may be smaller in width.

At operation 603, the video editing platform 124 determines if the object is moving. In response to determining that the object is moving, the process 600 proceeds to operation 604; otherwise the process 600 proceeds to operation 605. For example, the media analysis module 230 analyzes the position of the object in each frame in the shot to determine whether the position is substantially unchanged or if the object moves (e.g., if a person is walking across the screen, the object is moving). Namely, the media analysis module 230 determines whether the position of the object relative to other elements in the frames of the shot changes by more than a threshold amount.

At operation 604, the video editing platform 124 pans the vertical window along the direction of object movement to maintain the object within view of the vertical window as the object moves. For example, the media analysis module 230 changes the position of the vertical window at each frame in the shot in accordance with the position of the object in the given frame so that the window continues to keep the object in the center of the window throughout every frame of the shot in which the object appears.

At operation 605, the video editing platform 124 automatically crops a continuous portion of frames in the shot to remove content from the frames that is outside of the vertical window. For example, the media analysis module 230 removes any content in the frames of the shot that is outside of the vertical window. Specifically, any content that exceeds the width of the vertical window is removed or marked for removal from the shot. In particular, to crop a set of frames, the video editing platform 124 alters the images in the continuous portion of frames to retain the portions of the images in each frame that are within the vertical window. The altered set of images in the frames are then stored as a new or edited set of frames of the corresponding video in memory (e.g., database 120) using the processors of the video editing platform 124 (e.g., the processors of application server 112).

At operation 606, the video editing platform 124 determines that the first and second objects are substantially static. For example, the media analysis module 230 detects the position of each object in the shot. Specifically, if the objects are two people, the media analysis module 230 detects the positions of the two people in the frames of the shot. The media analysis module 230 determines whether the positions of the two people do not change throughout the frames of the shot by more than a threshold amount to determine that the objects are substantially static in the frames of the shot.

At operation 607, the video editing platform 124 stacks a first portion of each frame on top of a second portion of each frame. For example, the media analysis module 230 obtains a vertical window that has a vertical aspect ratio. The media analysis module 230 generates two copies of the shot, reduces the size of the two copies to fit in half or respective sections of the window (e.g., less than all of the window), and inserts each copy in a respective section (e.g., top and bottom) of the window. The media analysis module 230 slides the shot in the top section of the window to center the first object featured in the shot in the top section of the window. The media analysis module 230 slides the shot in the bottom section of the window to center the second object featured in the shot in the bottom section of the window. The media analysis module 230 crops to remove other content in the shot that is not shown in the top and bottom sections of the window. In some implementations, the media analysis module 230 stores instructions for the cropping operations that are performed to modify the frames in a shot in response to receiving a user confirmation accepting the automatically generated modification when an indication of the modification is presented to the user in an editing screen.

Figure 8:
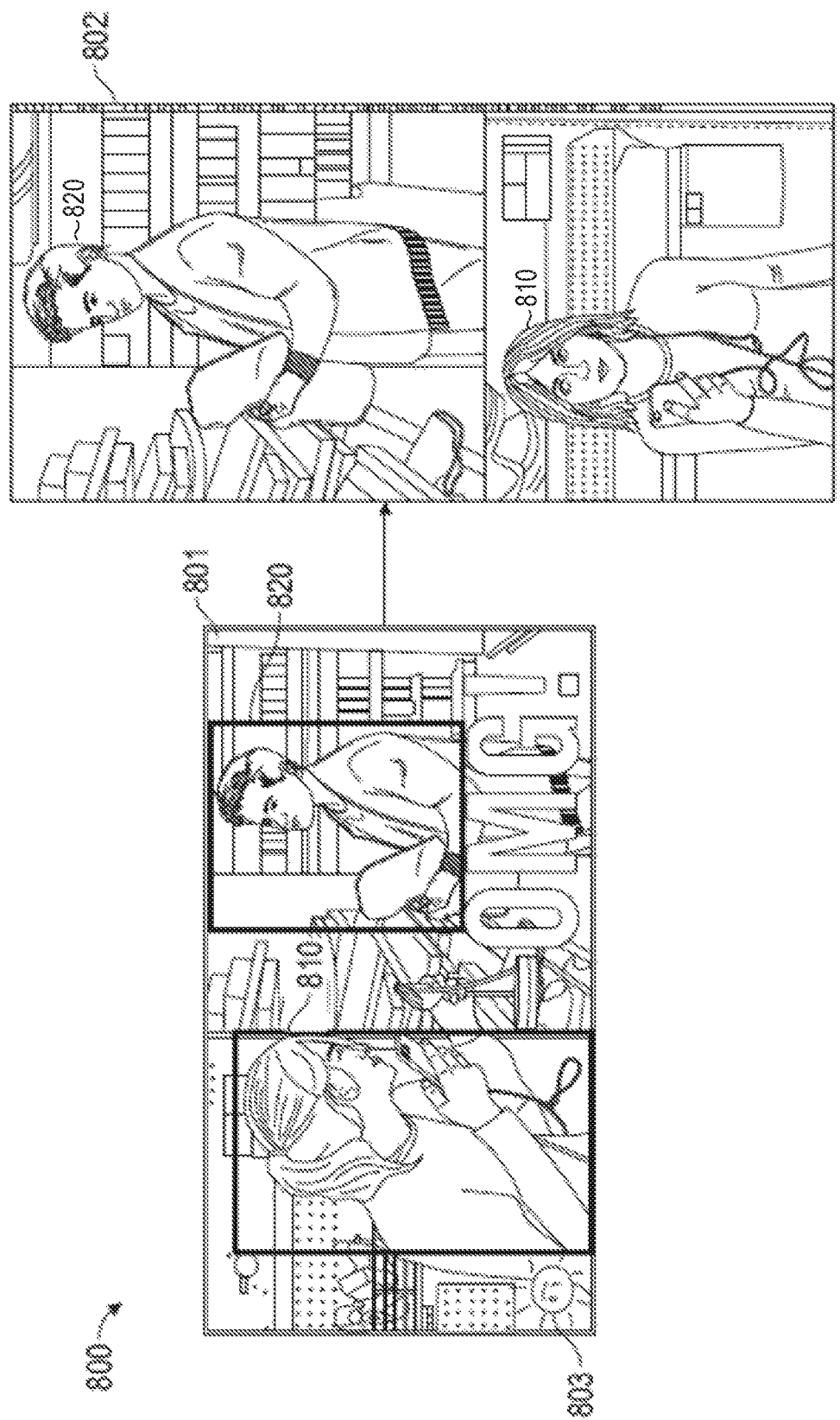

An illustrative example 800 showing the conversion of a horizontal image to a vertical image with one object stacked on top of another is shown in FIG. 8. The example 800 is an example of a set of stored instructions for how to modify a shot in response to a user confirming acceptance of the automatically generated modification. Once the user confirms acceptance, the shot is modified in the manner shown in example 800. As an example, the media analysis module 230 detects two objects, a first object 810 and a second object 820 in the horizontal frame 801. The media analysis module 230 generates a frame 802 of a vertical shot in which the media analysis module 230 positions the second object 820 on top of the first object 810. Namely, after processing the horizontal frame 801 of a horizontal shot, the media analysis module 230 automatically generates a vertical frame 802 for the shot in which one object 820 is stacked on top of another 810. The media analysis module 230 also removes some content 803 that is outside of the vertical window in the process of automatically stacking the objects 810, 820 on top of each other.

Returning to FIG. 6, at operation 608, the video editing platform 124 determines that the three or more objects are substantially static in frames of the shot. For example, the media analysis module 230 detects the position of each object in the shot. Specifically, if the objects are three people, the media analysis module 230 detects the positions of the three people in the frames of the shot. The media analysis module 230 determines whether the positions of the three people do not change throughout the frames of the shot by more than a threshold amount to determine that the objects are substantially static in the frames of the shot.

At operation 609, the video editing platform 124 generates a reduced size version of the frames that includes the three or more objects. For example, media analysis module 230 scales down the horizontal or square frames to fit within a section (less than all) of a vertical window. Namely, the vertical window may be divided into two equal sections each having a height that is half of the height of the received video in the first aspect ratio and a width that is less than the width of the received video. The media analysis module 230 shrinks each frame completely to fit within one of the sections of the vertical window.

At operation 610, the video editing platform 124 stacks, within a vertical window, the reduced size version of the frames in a first section of the vertical window and a portion of each frame in a remaining section of the vertical window. For example, the media analysis module 230 positions the scaled down frames into a top section of the vertical window and positions one or more elements of the frames into a bottom section of the window. Specifically, the media analysis module 230 focuses the bottom section of the vertical window on one of the objects in the frame, crops out other content 803 that is outside of the bottom section of the window, and reduces a size of the object to fit within the bottom section of the window.

Referring back to FIG. 5, at operation 503, the video editing platform 124 generates, for display, a plurality of representations each associated with a respective one of the plurality of shots. For example, the media analysis module 230 presents a list of shots that were detected as icons or visual representations to a user at a client device 102 in a video editing screen 700 (FIG. 7). Each icon or visual representation includes a frame from the corresponding shot associated with the icon or visual representation. The icons or visual representations presented in the video editing screen 700 are interactive and selectable.

At operation 504, the video editing platform 124 receives a user selection of a given representation of the plurality of representations corresponding to the first shot. For example, a user can position a cursor 712 over one of the shot representations or icons shown in video editing screen 700 (FIG. 7). The cursor 712 visually distinguishes the icon or visual representation to indicate it has been selected, and in response, the information in the video editing screen 700 is updated to correspond to the shot associated with the icon or visual representation highlighted by cursor 712. For example, the video editing platform 124 accesses a memory in which a set of consecutive frames corresponding to the selected icon or visual representation are stored. The accessed frames are presented in a third portion 730.

At operation 505, the video editing platform 124, in response to receiving the user selection of the given representation, generates, for display, an indication of the automatically generated modification to the visual presentation of the one or more objects in the first shot. For example, the video editing platform 124 presents in the second portion 720 an indication of the automatically generated modification for the selected shot corresponding to cursor 712. Further details of this indication are described below in connection with FIG. 7. In an embodiment, an "accept automatic modification" option 724 and a "manually edit shot" option 726 are presented. In response to the user selecting the "accept automatic modification" option 724, the video editing platform 124 retrieves the modification instructions corresponding to the automatically generated modification to the shot presented by the indication. The video editing platform 124 modifies the frames of the shot in the manner indicated and according to the modification instructions. The frames can be stored as a separate file that includes modified frames corresponding to the shot and/or can replace the frames of the shot that were received.

FIG. 7 is illustrative user interface of a video editing screen 700 of the video editing platform 124, according to example embodiments. Video editing screen 700 is presented to a client device 102 after at least one of the shots of the video uploaded by the client device 102 has been automatically reformatted. The video editing screen 700 includes a first portion 710 that represents shots of the video; a second portion 720 that includes one or more layout options and an indication of an automatically generated modification; a third portion 730 that includes a timeline of a selected one of the shots from the first portion 710; and a preview portion 740 in which a preview of the edited video is played back. In some embodiments, a layer selection option is provided, allowing the user to select a layer from a plurality of layers to edit. Video editing screen 700 includes a publish option (not shown) allowing the user to accept all the edits made in one or more layers to have the system combine the layers into a single video file.

For example, if the user selects a video layer, video editing screen 700 presents video frames corresponding to a selected shot in time in the preview portion 740 and presents a list of layout modification options in second portion 720. The video editing screen 700 accesses one or more automatically generated modifications to the content in the selected video layer and presents an indication of such automatically generated modifications for the video layer in the second portion 720. In this layer, the user can make adjustments or edits to the arrangement of objects in each frame to convert the arrangement and crop the video from a horizontal or square layout to a vertical layout by selecting options in second portion 720.

As another example, if the user selects an audio or text layer, video editing screen 700 presents audio segments or text information corresponding to a selected shot in time in the preview portion 740 and presents a list of layout modification options in second portion 720. The video editing screen 700 accesses one or more automatically generated modifications to the content in the selected audio or text layer and presents an indication of such automatically generated modifications for the audio or text layer in the second portion 720. The user can adjust how the audio or text is presented in the video file at each time point of the shot using the layout modification options in the second portion 720. Specifically, if the user selects a text or image layer, video editing screen 700 presents empty frames (or copies of the frames of the video from the first layer) corresponding to a selected shot in time in the preview portion 740 and presents a list of text or image options in the second portion 720. In this layer, the user can select between the text or image options presented in the second portion 720 to add text or images at user-selected positions in a selected frame or set of frames in a selected shot. As discussed above, after all the layers are done being edited either automatically or by the user, a publish option can be selected to combine all the layers in time into a single video file for distribution to a plurality of users.

In the first portion 710 is a complete list of icons or visual representations of shots of the video that were generated by the media analysis module 230. The list of icons or visual representations of the shots may be arranged in chronological order according to the timecode of the shots indicating when the shot appeared in the video. A horizontal thumbnail is shown for each shot as well as the timecode of the shot. This horizontal thumbnail is generated based on the frame selected by the media analysis module 230 to represent the shot in an icon. In some implementations, only one shot can be selected from the first portion 710 at a time to be represented by the third portion 730 and fourth portion 740. By default, the first shot is selected to be represented by the third portion 730 and fourth portion 740 and to be edited using second portion 720. The selected shot is visually indicated using cursor 712.

Chapter breaks are visualized as list headers. In some implementations, a cursor is hovered near a boundary between two shot entries to reveal additional options. Such additional options include a "merge shot" option and an "add chapter" option. In response to hovering the cursor over the merge shot option, the video editing screen 700 highlights the shot above and the shot below the boundary over which the cursor is hovered to indicate these shots will be merged. In response to receiving a user selection of the merge shot option after the cursor is hovered over the option, the two shots are combined into a new, combined shot using the formatting parameters of the first shot (e.g., the upper shot). In some implementations, the formatting parameters of the second shot (e.g., the lower shot) are selected and used to automatically adjust and reformat the presentation of the objects in the first shot (e.g., the upper shot). A new icon is used to represent the combined shots by selecting one of the frames that is in the two shots (e.g., the first, middle, or last frame). In response to receiving a user selection of the add chapter option, the video editing screen 700 adds a new chapter break between the two shots. In response to hovering the cursor over the add chapter option, a delete option is presented that allows the user to delete the chapter break in response to selection of the delete option.

Third portion 730 presents a simplified timeline which shows frames from a shot currently selected from first portion 710. Third portion 730 also presents some frames from a shot that precedes the selected shot and some frames from a shot that follows the selected shot, if they exist. In some embodiments, the center 80% of the timeline presents frames from the currently selected shot and the remaining 10% on either side of the frames from the currently selected shot present frames from the previous and next shots. In some cases, there may not be a previous or next shot and in such circumstances, 90% of the timeline presents frames from the currently selected shot and the remaining 10% presents frames from the available previous or next shot. In some implementations, the frames from the currently selected shot are visually distinguished (e.g., highlighted) from the frames of the adjacent shots. A play head (not shown) can be dragged to visualize the current time code corresponding to a frame from the shot that is presented in the fourth portion 740. A cursor can be hovered over the play head to reveal a split shot option. In response to receiving a user selection of the split shot option, the video editing screen 700 divides the shot into two shots at the frame identified by the play head. In some embodiments, the split shot option is revealed only when the video is in a paused state and presenting a single frame in the fourth portion 740.

The third portion 730 also includes options to control playback (e.g., a play and pause option and skip shot option), perform shot editing operations, and perform other management operations. For example, options are presented to control looping and playback speed. The looping controls cycles between three values, straight through playback (e.g., playback continues from one shot to the next), looping playback on the current shot only (e.g., playback starts from the first frame of the currently selected shot upon reaching the last frame of the selected shot), and looping playback on the current shot with some frames from the next/previous shots included. A playback speed control is provided to control the playback speed ranging from 50% speed, 100% speed, and 200% speed. This controls the rate at which the frames of the selected shot are transitioned for presentation in the fourth portion 740.

A "left/right nudge play head" option and a "split current shot" option are also provided in the third portion 730. The left/right nudge play head advances the play head by a single frame forward or backwards. Namely, if a particular frame in a pause state is presented in the fourth portion 740, selection of the left nudge play head option causes an adjacent, previous frame to be selected and presented in the fourth portion 740 instead of the current frame. The next or previous frame can be selected based on the looping conditions that are selected. For example, if the last frame is currently being shown in the fourth portion 740 and the looping option is set to loop the current shot, then the next frame that is selected to be shown when the right nudge play head option is selected is the first frame of the currently selected shot rather than the first frame of the next adjacent shot. The split current shot option splits the current shot into two shots at the current play head position. Additional options that can be included in the third portion include a "done" option to commit the current formatting changes to the project or video for publishing publicly, a "re-render the video and return the user to another screen" option, a "download" option to download the formatted video to a local storage of the client device 102, and a "discard changes" option to not commit to store any of the reformatting performed for a given shot or video.

The second portion 720 includes various user interface controls to adjust the formatting parameters of the currently selected shot. Four layout options can be provided, including a full frame option, a letterbox option, a two-way split option, and a three way split option. Selection of one of the options in the second portion 720 allows the user to modify the presentation of the objects shown in the fourth portion 740 by manually moving a vertical window to control what content 803 is retained and what content 803 is cropped from the frame or shot. In some embodiments, if a text or image layer is selected, the options presented in second portion 720 include text or image options allowing the user to add specific selected or typed-in text or image files or video to a specified frame or frames in a shot at a user-selected position within each frame.

The full frame option causes a vertical window to be positioned over a given object in the frame shown in the fourth portion 740. Depending on whether the object is static or moving, the vertical window can pan to continue being positioned over the object. Specifically, in the static mode, dragging the vertical window anywhere on the video translates the video while maintaining the constraint that the video always fills the frame. Corner and side handles can be used to scale the video up or down using the center of the video as the origin for the operation, again maintaining the fill constraint. In the default state, the video is at 100% scale, which is the smallest scale that fills the frame. If the pan mode is enabled by selecting the pan option, additional pan options are presented. A user can position the vertical window over a portion of the frame shown in the fourth portion 740. The user can select the transition period from a set of options and a direction to control how quickly and in which direction the vertical window slides to follow the object over which the vertical window is positioned.

The letterbox option enables a user to drag a letterbox layout that is smaller in height than the vertical window. Dragging the letterbox anywhere on the video translates the video, but only horizontally and not vertically. The width of the frame may always be filled, and that constraint is maintained by the drag interaction. Scaling the video is also possible with the constraint that the width of the frame is filled. Any content 803 that is outside of the letterbox is cropped and removed from the frame.

The two-way split option, when selected, generates two copies of the video, and one of the copies is selected at a time. The interactions for each video are identical to the full-frame interactions, and it is possible to adjust the split ration by dragging a separator vertically. Namely, a vertical window with top and bottom sections is presented over the frame shown in the fourth portion 740. A first copy of the video is selected and the user can adjust the size of the first copy to scale down the frames to fit within the top section; similarly, the second copy can be selected and adjusted in size to fit within the bottom section of the window. The sizes of the top and bottom sections can be changed such that the top is larger or smaller than the bottom. After scaling the copies to fit in their respective sections of the vertical window, the copies can be dragged to keep an object of interest in view in the given section. For example, the copy on the top can be dragged to keep only a first person shown in the frame in the top section and the copy on the bottom can be dragged to keep only a second person shown in the frame in the bottom section. The selected format and layout is automatically applied to all the frames of the currently selected shot. The three-way split option, when selected, generates three copies of the video and presents a vertical window with three sections. Manipulations of the video frames in the three-way split are performed in a similar manner as the two-way split.

In some embodiments, the video editing platform 124 automatically generates a modification to an arrangement of one or more objects in shots of a given video. Such a modification is indicated to the user in the second portion 720. Specifically, in response to receiving a user selection of a shot using cursor 712, the video editing platform 124 retrieves any automatically generated modifications made to the selected layer of the shot. As an example, the automatically generated modification includes a statically positioned vertical window. This window is positioned over a static object in one or more frames of a shot to indicate how the shot will be cropped. In such cases, the indication includes using an indicator 722 to visually distinguish the full frame option. This indication is presented in response to the user selecting the shot using cursor 712. In some implementations, a prompt (not shown) is presented to the user describing the automatically generated modification instead or in addition to presenting indicator 722.

A preview showing to the user which portions of the frames in the shot will be cropped if the automatically generated modification is accepted is presented in the fourth portion 740. For example, a vertical window is positioned over the frames of the shot shown in the fourth portion 740, indicating to the user which sections of the frame will be retained in the modified shot and which sections will be cropped. Namely, sections inside of the vertical window will be retained and sections outside of the vertical window will be cropped. In response to receiving a user selection of the accept automatic modification option 724, the video editing platform 124 modifies the frames of the shot in the manner shown in the fourth portion 740. A user can discard, or supplement and make additional changes to, the automatically generated modifications by selecting the manually edit shot option 726.

Figure 9:
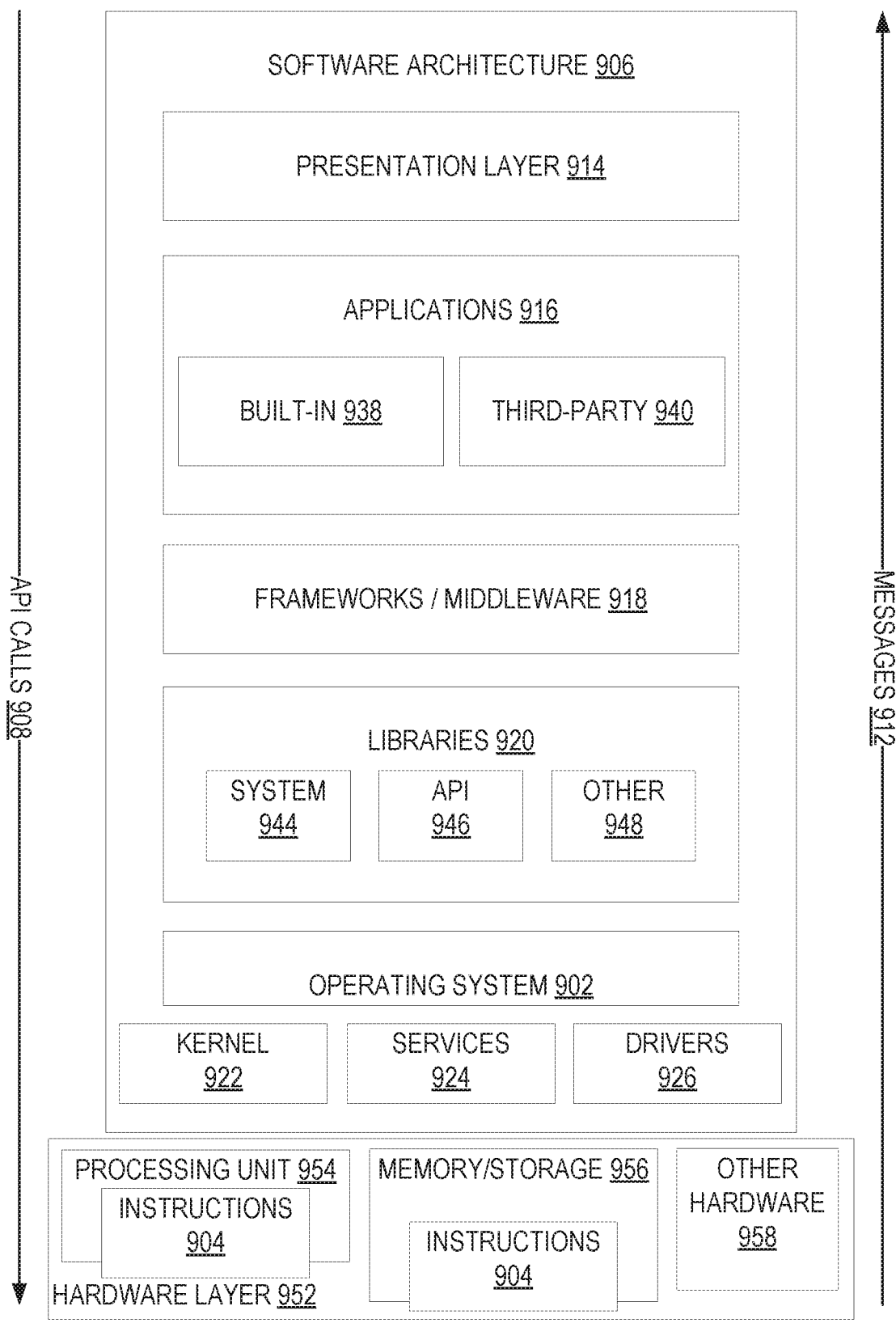
FIG. 9 is a block diagram illustrating a representative software architecture, which may be used in conjunction with various hardware architectures herein described, according to example embodiments.

FIG. 9 is a block diagram illustrating an example software architecture 906, which may be used in conjunction with various hardware architectures herein described. FIG. 9 is a non-limiting example of a software architecture and it will be appreciated that many other architectures may be implemented to facilitate the functionality described herein. The software architecture 906 may execute on hardware such as machine 1000 of FIG. 10 that includes, among other things, processors 1004, memory 1014, and input/output (I/O) components 1018. A representative hardware layer 952 is illustrated and can represent, for example, the machine 1000 of FIG. 10. The representative hardware layer 952 includes a processing unit 954 having associated executable instructions 904. Executable instructions 904 represent the executable instructions of the software architecture 906, including implementation of the methods, components, and so forth described herein. The hardware layer 952 also includes memory and/or storage modules memory/storage 956, which also have executable instructions 904. The hardware layer 952 may also comprise other hardware 958.

In the example architecture of FIG. 9, the software architecture 906 may be conceptualized as a stack of layers where each layer provides particular functionality. For example, the software architecture 906 may include layers such as an operating system 902, libraries 920, frameworks/middleware 918, applications 916, and a presentation layer 914. Operationally, the applications 916 and/or other components within the layers may invoke API calls 908 through the software stack and receive messages 912 in response to the API calls 908. The layers illustrated are representative in nature and not all software architectures have all layers. For example, some mobile or special purpose operating systems 902 may not provide a frameworks/middleware 918, while others may provide such a layer. Other software architectures may include additional or different layers.

The operating system 902 may manage hardware resources and provide common services. The operating system 902 may include, for example, a kernel 922, services 924, and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 920 provide a common infrastructure that is used by the applications 916 and/or other components and/or layers. The libraries 920 provide functionality that allows other software components to perform tasks in an easier fashion than to interface directly with the underlying operating system 902 functionality (e.g., kernel 922, services 924 and/or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries (e.g., libraries to support presentation and manipulation of various media format such as MPEG4, H.264, MP3, AAC, AMR, JPG, PNG), graphics libraries (e.g., an OpenGL, framework that may be used to render two-dimensional and three-dimensional media in a graphic content on a display), database libraries (e.g., SQLite that may provide various relational database functions), web libraries (e.g., WebKit that may provide web browsing functionality), and the like. The libraries 920 may also include a wide variety of other libraries 948 to provide many other APIs to the applications 916 and other software components/modules.

The frameworks/middleware 918 (also sometimes referred to as middleware) provide a higher-level common infrastructure that may be used by the applications 916 and/or other software components/modules. For example, the frameworks/middleware 918 may provide various graphic UI (GUI) functions, high-level resource management, high-level location services, and so forth. The frameworks/middleware 918 may provide a broad spectrum of other APIs that may be utilized by the applications 916 and/or other software components/modules, some of which may be specific to a particular operating system 902 or platform.

The applications 916 include built-in applications 938 and/or third-party applications 940. Examples of representative built-in applications 938 may include, but are not limited to, a contacts application, a browser application, a book reader application, a location application, a media application, a messaging application, and/or a game application. Third-party applications 940 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 940 may invoke the API calls 908 provided by the mobile operating system (such as operating system 902) to facilitate functionality described herein.

The applications 916 may use built-in operating system functions (e.g., kernel 922, services 924, and/or drivers 926), libraries 920, and frameworks/middleware 918 to create UIs to interact with users of the system. Alternatively, or additionally, in some systems, interactions with a user may occur through a presentation layer, such as presentation layer 914. In these systems, the application/component "logic" can be separated from the aspects of the application/component that interact with a user.

Figure 10:
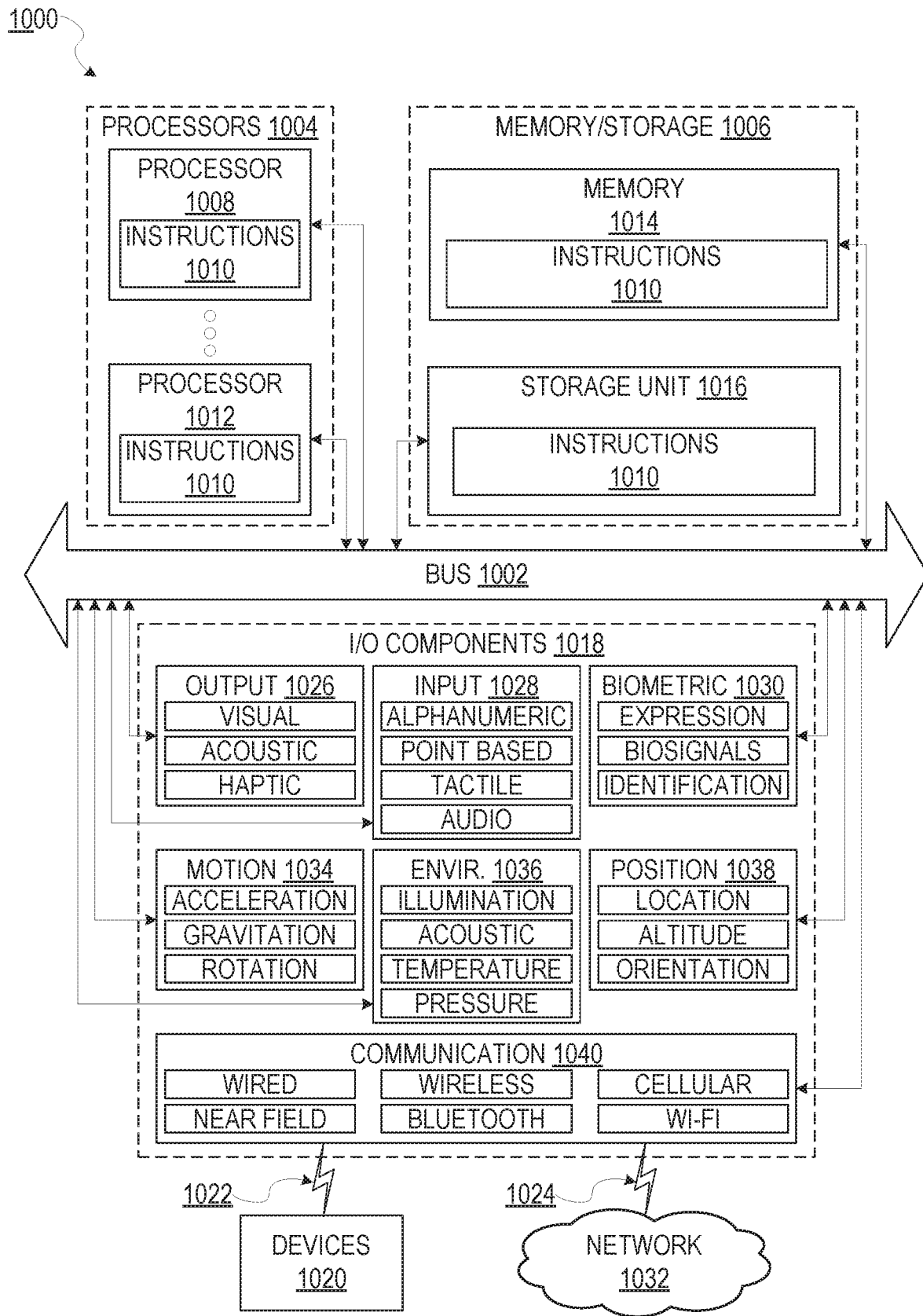
FIG. 10 is a block diagram illustrating components of a machine able to read instructions from a machine-readable medium (e.g., a machine-readable storage medium) and perform any one or more of the methodologies discussed herein, according to example embodiments.

FIG. 10 is a block diagram illustrating components of a machine 1000, according to some example embodiments, able to read instructions 1010 from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 1000 capable of executing the instructions 1010, sequentially or otherwise, that specify actions to be taken by machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004, memory/storage 1006, and I/O components 1018, which may be configured to communicate with each other such as via a bus 1002. In an example embodiment, the processors 1004 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1008 and a processor 1012 that may execute the instructions 1010. The term "processor" is intended to include multi-core processors 1004 that may comprise two or more independent processors (sometimes referred to as "cores") that may execute instructions 1010 contemporaneously. Although FIG. 10 shows multiple processors 1004, the machine 1000 may include a single processor with a single core, a single processor with multiple cores (e.g., a multi-core processor), multiple processors with a single core, multiple processors with multiple cores, or any combination thereof.

The memory/storage 1006 may include a memory 1014, such as a main memory, or other memory storage, and a storage unit 1016, both accessible to the processors 1004 such as via the bus 1002. The storage unit 1016 and memory 1014 store the instructions 1010, embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof, during execution thereof by the machine 1000. Accordingly, the memory 1014, the storage unit 1016, and the memory of processors 1004 are examples of machine-readable media.

The I/O components 1018 may include a wide variety of components to receive input, provide output, produce output, transmit information, exchange information, capture measurements, and so on. The specific I/O components 1018 that are included in a particular machine 1000 will depend on the type of machine. For example, portable machines such as mobile phones will likely, include a touch input device or other such input mechanisms, while a headless server machine will likely not include such a touch input device. It will be appreciated that the I/O components 1018 may include many other components that are not shown in FIG. 10. The I/O components 1018 are grouped according to functionality merely for simplifying the following discussion and the grouping is in no way limiting. In various example embodiments, the I/O components 1018 may include output components 1026 and input components 1028. The output components 1026 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1018 may include biometric components 1030, motion components 1034, environmental components 1036, or position components 1038 among a wide array of other components. For example, the biometric components 1030 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1034 may include acceleration sensor components (e.g., accelerometer), gravitation sensor components, rotation sensor components (e.g., gyroscope), and so forth. The environmental components 1036 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1038 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1018 may include communication components 1040 operable to couple the machine 1000 to a network 1032 or devices 1020 via coupling 1024 and coupling 1022, respectively. For example, the communication components 1040 may include a network interface component or other suitable device to interface with the network 1032. In further examples, communication components 1040 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1020 may be another machine or any of a wide variety of peripheral devices (e.g., a peripheral device coupled via a USB).

Moreover, the communication components 1040 may detect identifiers or include components operable to detect identifiers. For example, the communication components 1040 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040, such as location via Internet Protocol (IP) geo-location, location via Wi-Fi® signal triangulation, location via detecting a NFC beacon signal that may indicate a particular location, and so forth.

Glossary

"CARRIER SIGNAL", in this context, refers to any intangible medium that is capable of storing, encoding, or carrying transitory or non-transitory, instructions 1010 for execution by the machine 1000, and includes digital or analog communications signals or other intangible medium to facilitate communication of such instructions 1010. Instructions 1010 may be transmitted or received over the network 1032 using a transitory or non-transitory, transmission medium via a network interface device and using any one of a number of well-known transfer protocols.

"CLIENT DEVICE", in this context, refers to any machine 1000 that interfaces to a communications network 1032 to obtain resources from one or more server systems or other client devices 102. A client device 102 may be, but is not limited to, a mobile phone, desktop computer, laptop, PDAs, smart phones, tablets, ultra books, netbooks, laptops, multi-processor systems, microprocessor-based or programmable consumer electronics, game consoles, set-top boxes, or any other communication device that a user may use to access a network 1032.

"COMMUNICATIONS NETWORK", in this context, refers to one or more portions of a network 1032 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 1032 or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE", in this context, refers to a message 300 that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message 300 is transitory.

"MACHINE-READABLE MEDIUM", in this context, refers to a component, device, or other tangible media able to store instructions 1010 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable medium" should be taken to include a single medium or multiple media (e.g., a centralized or distributed database, or associated caches and servers) able to store instructions 1010. The term "machine-readable medium" shall also be taken to include any, medium, or combination of multiple media, that is capable of storing instructions 1010 (e.g., code) for execution by a machine 1000, such that the instructions 1010, when executed by one or more processors 1004 of the machine 1000, cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT", in this context, refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 1004) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor 1004 or other programmable processor. Once configured by such software, hardware components become specific machines 1000 (or specific components of a machine 1000) uniquely tailored to perform the configured functions and are no longer general-purpose processors 1004. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 1004 configured by software to become a special-purpose processor, the general-purpose processor 1004 may be configured as respectively different special-purpose processors (e.g., comprising different hardware components) at different times. Software accordingly configures a particular processor or processors 1004, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors 1004 that are temporarily configured (e.g., by software) or permanently configured to perform the relevant operations. Whether temporarily or permanently configured, such processors 1004 may constitute processor-implemented components that operate to perform one or more operations or functions described herein. As used herein, "processor-implemented component" refers to a hardware component implemented using one or more processors 1004. Similarly, the methods described herein may be at least partially processor-implemented, with a particular processor or processors 1004 being an example of hardware. For example, at least some of the operations of a method may be performed by one or more processors 1004 or processor-implemented components. Moreover, the one or more processors 1004 may also operate to support performance of the relevant operations in a "cloud computing" environment or as a "software as a service"

(SaaS). For example, at least some of the operations may be performed by a group of computers (as examples of machines 1000 including processors 1004), with these operations being accessible via a network 1032 (e.g., the Internet) and via one or more appropriate interfaces (e.g., an API). The performance of certain of the operations may be distributed among the processors 1004, not only residing within a single machine 1000, but deployed across a number of machines 1000. In some example embodiments, the processors 1004 or processor-implemented components may be located in a single geographic location (e.g., within a home environment, an office environment, or a server farm). In other example embodiments, the processors 1004 or processor-implemented components may be distributed across a number of geographic locations.

"PROCESSOR", in this context, refers to any circuit or virtual circuit (a physical circuit emulated by logic executing on an actual processor 1004) that manipulates data values according to control signals (e.g., "commands," "op codes," "machine code," etc.) and which produces corresponding output signals that are applied to operate a machine 1000. A processor 1004 may, for example, be a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor 1004 may further be a multi-core processor having two or more independent processors 1004 (sometimes referred to as "cores") that may execute instructions 1010 contemporaneously.

"TIMESTAMP", in this context, refers to a sequence of characters or encoded information identifying when a certain event occurred, for example giving date and time of day, sometimes accurate to a small fraction of a second.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:
   detecting, by one or more processors, a plurality of shots in a video, each shot comprising a sequence of frames;
   automatically generating, by the one or more processors, a modification to a visual presentation of one or more objects in a first shot of the plurality of shots, the modification comprising a first layout of the one or more objects in the first shot;
   generating, for display by the one or more processors, a plurality of icons each associated with a respective one of the plurality of shots;
   detecting that a cursor is hovered near a region in the display between two icons of the plurality of icons corresponding to the first shot and a second shot;
   in response to detecting that the cursor is hovered near the region between the two icons, causing presentation of a plurality of options corresponding to the first and second shots, each of the plurality of options that is displayed after the cursor is hovered near the region between the two icons corresponding to a different type of video editing operation, a first type of video editing operation being performed in response to detecting selection of a first option from the plurality of options that is displayed after the cursor is hovered near the region between the two icons;
   after detecting that the cursor is hovered near the region between the two icons, detecting that the cursor is hovered over the first option comprising a merge shot option;
   in response to detecting that the cursor is hovered over the merge shot option, visually highlighting the first shot and the second shot to indicate that the first shot will be merged with the second shot;
   in response to detecting selection of the merge shot option after detecting that the cursor is hovered over the merge shot option, combining the first shot and the second shot into a new shot;
   receiving, by the one or more processors, a user selection of a given icon from the two icons, the given icon corresponding to the first shot; and
   in response to receiving the user selection of the given icon, generating, for display by the one or more processors, an indication of the automatically generated modification to the visual presentation of the one or more objects in the first shot, wherein generating the indication comprises:
   causing presentation of a third icon corresponding to the first layout to be displayed together with a fourth icon corresponding to a second layout of the one or more objects that are in the first shot; and
   causing presentation of a visual indicator to be displayed in association with the third icon to indicate that the automatically generated modification corresponds to the first layout, the visual indicator visually distinguishing the third icon from the fourth icon to indicate that the fourth icon is selectable to replace application of the first layout to the first shot with application of the second layout to the first shot.

2. The method of claim 1, further comprising:
   receiving first user input that selects a first layer of a plurality of layers in the first shot;
   generating, as the indication, the automatically generated modification to the selected first layer while presenting a first preview of the first layer in the first shot;
   receiving second user input that selects a second layer of the plurality of layers in the first shot; and
   generating a second indication of an automatically generated modification to the selected second layer while presenting a second preview of the second layer in the first shot.

3. The method of claim 1, wherein the third icon represents a first arrangement of the one or more objects in the first shot and the fourth icon represents a second arrangement of the one or more objects that are in the first shot, further comprising:
   automatically generating a plurality of layouts for the first shot;
   ranking the plurality of layouts for the first shot; and
   selecting, a top ranked layout of the plurality of layouts as the modification to the visual presentation of the one or more objects in the first shot.

4. The method of claim 1, further comprising:
   automatically adjusting presentation of objects in the first shot based on one or more formatting parameters of the second shot.

5. The method of claim 1, further comprising generating a new icon to represent the new shot, wherein the icon comprises a first frame, middle frame or last frame from the new shot that includes the first and second shots, wherein the indication comprises a message describing the automatically generated modification, further comprising automatically generating the modification to the visual presentation of the one or more objects by identifying areas of sharp contrast in the first shot.

6. The method of claim 1 further comprising detecting a first shot of the plurality of shots by:
   determining a first video transition in the video;
   identifying a second video transition in the video that occurs after a contiguous sequence of frames in the video that are adjacent to and follow the first video transition; and
   automatically marking, as the first shot, the contiguous sequence of frames between the first video transition and the second video transition.

7. The method of claim 1, wherein a second option of the plurality of options includes a chapter break option which causes a chapter break to be inserted between the first and second shots, further comprising:
   detecting text in one or more frames in the first shot; and
   adjusting the visual presentation based on the detected text.

8. The method of claim 1, wherein automatically generating the modification comprises:
   determining that an object of the one or more objects is substantially static throughout a continuous portion of frames in the first shot;
   automatically aligning the object within a vertical window corresponding to a target aspect ratio; and
   automatically cropping the continuous portion of frames based on the vertical window to remove content from the continuous portion of frames that is outside of the vertical window.

9. The method of claim 1, wherein the one or more objects include first and second objects, and wherein automatically generating the modification comprises:
   determining that the second object appears together with the first object in a continuous portion of frames in the first shot;
   determining that the first and second objects are substantially static throughout the continuous portion of frames in the first shot; and
   for each frame of the continuous portion of frames, stacking a first portion of a frame comprising the first object on top of a second portion of the frame comprising the second object.

10. The method of claim 9, wherein stacking the first portion on top of the second portion comprises:
    obtaining a vertical window corresponding to a second aspect ratio;
    dividing the vertical window into first and second sections; and
    copying the continuous portion of frames in the first shot into the first and second sections.

11. The method of claim 1, wherein the one or more objects includes a first object, and wherein automatically generating the modification comprises:
    determining that two or more objects of the one or more objects appear together with the first object in a continuous portion of frames in the first shot;
    determining that the first object and the two or more objects are substantially static throughout the continuous portion of frames in the first shot;
    generating a reduced size version of the continuous portion of frames that includes the first object and the two or more objects; and
    for each frame of the continuous portion of frames, stacking, within a vertical window, the reduced size version of the continuous portion of frames in a first portion of the vertical window and a portion of each frame of the continuous portion of frames in a remaining portion of the vertical window, the first portion being smaller than the remaining portion.

12. The method of claim 1, wherein automatically generating the modification comprises:
    determining that an object of the one or more objects moves in a particular direction throughout a continuous portion of frames in the first shot;
    automatically aligning the object within a vertical window corresponding to a second aspect ratio;
    panning the vertical window along the particular direction to maintain the object within view of the vertical window as the object moves; and
    automatically cropping, as the vertical window is panned, the continuous portion of frames to remove content from the continuous portion of frames that is outside of the vertical window.

13. The method of claim 1, further comprising generating for display an editing interface comprising a first portion that includes the plurality of icons, a second portion that presents video corresponding to a selected one of the one or more shots, a third portion that includes a plurality of editing options, and a fourth portion representing a timeline of the selected one of the one or more shots, wherein the timeline comprises:
    a first section representing frames from the first shot corresponding to the user selection of the given icon; and
    a second section comprising a plurality of frames from another shot adjacent to the first shot, the another shot corresponding to another one of the icons, wherein the first section is visually distinguished from the second section.

14. The method of claim 13, further comprising displaying a split current shot option in the fourth portion, wherein selection of the split current shot option causes the first shot to be divided into two shots at a current play head position, wherein the visual indicator highlights the third icon relative to the fourth icon, wherein the third icon visually represents the first layout and the fourth icon visually represents the second layout, wherein the video is received via a website, wherein the indication is presented to a user on the website, and wherein the website publishes the automatically generated modification of the video, once confirmed by the user, for access by multiple users.

15. The method of claim 13, wherein the second portion includes a visual indicator of the first layout that distinguishes portions of the video in the first shot that are included from those that are excluded by the first layout, further comprising causing presentation of the indication of the automatically generated modification while an automated modification to the second shot of the plurality of shots is being generated, wherein an indicator is provided in association with the second shot to indicate that the second shot is being processed to generate the automated modification to the second shot.

16. A system comprising:
    a processor configured to perform operations comprising:
    detecting a plurality of shots in a video, each shot comprising a sequence of frames;
    automatically generating a modification to a visual presentation of one or more objects in a first shot of the plurality of shots, the modification comprising a first layout of the one or more objects in the first shot;
    generating, for display, a plurality of icons each associated with a respective one of the plurality of shots;

detecting that a cursor is hovered near a region in the display between two icons of the plurality of icons corresponding to the first shot and a second shot;

in response to detecting that the cursor is hovered near the region between the two icons, causing presentation of a plurality of options corresponding to the first and second shots, each of the plurality of options that is displayed after the cursor is hovered near the region between the two icons corresponding to a different type of video editing operation, a first type of video editing operation being performed in response to detecting selection of a first option from the plurality of options that is displayed after the cursor is hovered near the region between the two icons;

after detecting that the cursor is hovered near the region between the two icons, detecting that the cursor is hovered over the first option comprising a merge shot option;

in response to detecting that the cursor is hovered over the merge shot option, visually highlighting the first shot and the second shot to indicate that the first shot will be merged with the second shot;

in response to detecting selection of the merge shot option after detecting that the cursor is hovered over the merge shot option, combining the first shot and the second shot into a new shot;

receiving a user selection of a given icon from the two icons, the given icon corresponding to the first shot; and in response to receiving the user selection of the given icon, generating, for display, an indication of the automatically generated modification to the visual presentation of the one or more objects in the first shot, wherein generating the indication comprises:

causing presentation of a third icon corresponding to the first layout to be displayed together with a fourth icon corresponding to a second layout of the one or more objects that are in the first shot; and causing presentation of a visual indicator to be displayed in association with the third icon to indicate that the automatically generated modification corresponds to the first layout, the visual indicator visually distinguishing the third icon from the fourth icon to indicate that the fourth icon is selectable to replace application of the first layout to the first shot with application of the second layout to the first shot.

17. The method of claim 1, further comprising causing presentation of an option to accept automatically generated modifications to a plurality of layers in the first shot simultaneously.

18. The method of claim 1, wherein the modification is generated based on a detected orientation of a client device on which the first shot is presented.

19. The method of claim 1, wherein the plurality of options comprise a merge shot option and a chapter break option.

20. A non-transitory machine-readable storage medium that includes instructions that, when executed by one or more processors of a machine, cause the machine to perform operations comprising:

detecting a plurality of shots in a video, each shot comprising a sequence of frames;

automatically generating a modification to a visual presentation of one or more objects in a first shot of the plurality of shots, the modification comprising a first layout of the one or more objects in the first shot;

generating, for display, a plurality of icons each associated with a respective one of the plurality of shots;

detecting that a cursor is hovered near a region in the display between two icons of the plurality of icons corresponding to the first shot and a second shot;

in response to detecting that the cursor is hovered near the region between the two icons, causing presentation of a plurality of options corresponding to the first and second shots, each of the plurality of options that is displayed after the cursor is hovered near the region between the two icons corresponding to a different type of video editing operation, a first type of video editing operation being performed in response to detecting selection of a first option from the plurality of options that is displayed after the cursor is hovered near the region between the two icons;

after detecting that the cursor is hovered near the region between the two icons, detecting that the cursor is hovered over the first option comprising a merge shot option;

in response to detecting that the cursor is hovered over the merge shot option, visually highlighting the first shot and the second shot to indicate that the first shot will be merged with the second shot;

in response to detecting selection of the merge shot option after detecting that the cursor is hovered over the merge shot option, combining the first shot and the second shot into a new shot;

receiving a user selection of a given icon from the two icons, the given icon corresponding to the first shot; and in response to receiving the user selection of the given icon, generating, for display by the one or more processors, an indication of the automatically generated modification to the visual presentation of the one or more objects in the first shot, wherein generating the indication comprises:

causing presentation of a third icon corresponding to the first layout to be displayed together with a fourth icon corresponding to a second layout of the one or more objects that are in the first shot; and causing presentation of a visual indicator to be displayed in association with the third icon to indicate that the automatically generated modification corresponds to the first layout, the visual indicator visually distinguishing the third icon from the fourth icon to indicate that the fourth icon is selectable to replace application of the first layout to the first shot with application of the second layout to the first shot.

* * * * *